(12) United States Patent
Forsgren et al.

(10) Patent No.: US 12,322,122 B2
(45) Date of Patent: Jun. 3, 2025

(54) MOTION BASED PRE-PROCESSING OF TWO-DIMENSIONAL IMAGE DATA PRIOR TO THREE-DIMENSIONAL OBJECT TRACKING WITH VIRTUAL TIME SYNCHRONIZATION

(71) Applicant: Topgolf Sweden AB, Danderyd (SE)

(72) Inventors: Daniel Forsgren, Enebyberg (SE); Stein Norheim, Spånga (SE)

(73) Assignee: Topgolf Sweden AB, Danderyd (SE)

( * ) Notice: Subject to any disclaimer, the term of this patent is extended or adjusted under 35 U.S.C. 154(b) by 337 days.

(21) Appl. No.: 18/097,032

(22) Filed: Jan. 13, 2023

(65) Prior Publication Data

US 2023/0215025 A1    Jul. 6, 2023

Related U.S. Application Data

(63) Continuation of application No. 17/745,176, filed on May 16, 2022, now Pat. No. 11,557,044, which is a
(Continued)

(51) Int. Cl.
*G06T 7/292* (2017.01)
*G06T 7/00* (2017.01)
(Continued)

(52) U.S. Cl.
CPC ............. *G06T 7/292* (2017.01); *G06T 7/248* (2017.01); *G06T 7/70* (2017.01); *G06T 7/74* (2017.01);
(Continued)

(58) Field of Classification Search
CPC .. G06T 7/292; G06T 7/74; G06T 7/97; G06T 7/248; G06T 7/70; G06T 2207/10016;
(Continued)

(56) References Cited

U.S. PATENT DOCUMENTS 7,843,510 B1   11/2010   Ayer et al.
8,077,917 B2   12/2011   Forsgren
(Continued)

FOREIGN PATENT DOCUMENTS

CN   103620682   3/2014
CN   109792543   5/2019
(Continued)

OTHER PUBLICATIONS

Extended European Search Report in European Appln No. 24200931.4, dated Dec. 6, 2024, 11 pages.
(Continued)

*Primary Examiner* — Manav Seth
(74) *Attorney, Agent, or Firm* — Fish & Richardson P.C.

(57) ABSTRACT

Methods, systems, and apparatus, including medium-encoded computer program products, for pre-processing image data before 3D object tracking include, in at least one aspect, a method including: performing object detection in uncompressed, two-dimensional image data from a camera to produce two-dimensional location data for objects of interest; processing the two-dimensional location data for the objects of interest using a motion criterion to generate possible paths data for the objects of interest; and constructing a flight track of an object in three-dimensional space, from the possible paths data and position information obtained from a sensor, by filtering out false positives in the possible paths data.

25 Claims, 7 Drawing Sheets

Related U.S. Application Data continuation of application No. 17/404,953, filed on Aug. 17, 2021, now Pat. No. 11,335,013, which is a continuation of application No. PCT/EP2021/072732, filed on Aug. 16, 2021.

(60) Provisional application No. 63/065,872, filed on Aug. 14, 2020.

(51) Int. Cl.
    *G06T 7/246*     (2017.01)
    *G06T 7/70*     (2017.01)
    *G06T 7/73*     (2017.01)
    *G06V 10/25*     (2022.01)
    *H04N 23/90*     (2023.01)

(52) U.S. Cl.
    CPC ............... *G06T 7/97* (2017.01); *G06V 10/25* (2022.01); *H04N 23/90* (2023.01); *G06T 2207/10016* (2013.01); *G06T 2207/30224* (2013.01); *G06T 2207/30241* (2013.01)

(58) Field of Classification Search
    CPC ........... G06T 2207/30224; G06T 2207/30241; G06V 10/25; H04N 23/90
    See application file for complete search history.

(56) References Cited

U.S. PATENT DOCUMENTS

| | | | |
|---|---|---|---|
| 8,335,345 B2 | 12/2012 | White et al. | |
| 8,339,456 B2 | 12/2012 | Eledath et al. | |
| 9,339,715 B2 | 5/2016 | Luciano, Jr. et al. | |
| 9,406,131 B2 | 8/2016 | Wurmlin et al. | |
| 9,555,284 B2 | 1/2017 | Vollbrecht et al. | |
| 9,649,545 B2 | 5/2017 | Dawe et al. | |
| 10,045,008 B2 | 8/2018 | Kwon et al. | |
| 10,147,191 B1 | 12/2018 | Ribeiro et al. | |
| 10,238,943 B2 | 3/2019 | Vollbrecht et al. | |
| 10,380,409 B2 * | 8/2019 | Thornbrue | G06V 20/647 |
| 10,596,416 B2 | 3/2020 | Forsgren | |
| 10,639,537 B2 | 5/2020 | Kiraly et al. | |
| 10,762,642 B2 * | 9/2020 | Marty | G06T 7/80 |
| 10,898,757 B1 | 1/2021 | Johansson et al. | |
| 10,989,791 B2 | 4/2021 | Tuxen et al. | |
| 11,064,107 B2 | 7/2021 | Gefen et al. | |
| 11,132,807 B2 | 9/2021 | Okutani | |
| 11,135,497 B2 * | 10/2021 | Joo | G06T 7/248 |
| 11,157,742 B2 * | 10/2021 | Zhang | G06V 10/764 |
| 2004/0249848 A1 * | 12/2004 | Carlbom | G06F 16/48 707/999.102 |
| 2007/0238539 A1 | 10/2007 | Dawe et al. | |
| 2008/0281553 A1 | 11/2008 | Frank et al. | |
| 2008/0293464 A1 | 11/2008 | Cheng et al. | |
| 2008/0293488 A1 | 11/2008 | Cheng et al. | |
| 2008/0312010 A1 | 12/2008 | Marty et al. | |
| 2011/0273562 A1 | 11/2011 | Dawe et al. | |
| 2014/0111625 A1 | 4/2014 | Dawe et al. | |
| 2014/0301598 A1 | 10/2014 | Marty et al. | |
| 2016/0071548 A1 | 3/2016 | House et al. | |
| 2016/0307335 A1 | 10/2016 | Perry et al. | |
| 2016/0379074 A1 | 12/2016 | Nielsen et al. | |
| 2018/0011184 A1 | 1/2018 | Du Toit et al. | |
| 2018/0120428 A1 | 5/2018 | Tuxen et al. | |
| 2018/0369638 A1 | 12/2018 | Guerci et al. | |
| 2019/0224552 A1 | 7/2019 | Kiraly et al. | |
| 2020/0025903 A1 | 1/2020 | Tuxen et al. | |
| 2020/0038742 A1 | 2/2020 | Van Wagoner et al. | |
| 2020/0057889 A1 | 2/2020 | Lee et al. | |
| 2021/0409768 A1 | 12/2021 | Joshi et al. | |
| 2024/0273738 A1 * | 8/2024 | Forsgren | G06T 7/251 |

FOREIGN PATENT DOCUMENTS

| | | |
|---|---|---|
| EP | 1899025 | 3/2008 |
| JP | 2008284166 | 11/2008 |
| JP | 2019175115 | 10/2019 |
| KR | 10-2010-0102583 | 9/2010 |
| WO | WO 1997028856 | 8/1997 |
| WO | WO 1999051990 | 10/1999 |
| WO | WO 2006097357 | 9/2006 |
| WO | WO 2010040219 | 4/2010 |
| WO | WO 2018105290 | 6/2018 |
| WO | WO 2018138708 | 8/2018 |
| WO | WO 2019099780 | 5/2019 |
| WO | WO 2019122922 | 6/2019 |

OTHER PUBLICATIONS

Kamble et al., "Ball tracking in sports: a survey," Artif. Intell. Rev., Oct. 2017, 52(3):1655-1705.

Kumar et al., "3D Estimation and Visualization of Motion in a Multicamera Network for Sports," 2011 Irish Machine Vision and Image Processing Conference, Dublin, Ireland, Sep. 7-9, 2011, 15-19.

Miyata et al., "Ball 3D Trajectory Reconstruction without Preliminary Temporal and Geometrical Camera Calibration," In Proceedings of the 30th IEEE Conference on Computer Vision and Pattern Recognition Workshops, CVPRW 2017, Hawaii, USA, Jul. 21-26, 2017, 164-169.

Zupancic et al., "Automatic Golf Ball Trajectory Reconstruction and Visualization," In Proceedings of the Computer Vision/Computer Graphics Collaboration Techniques (Mirage 2009), Rocquencourt, France, May 4-6, 2009, 150-160.

Office Action in Chinese Appln. No. 202180055447.7, dated Oct. 13, 2023, 13 pages (with English translation).

Office Action in Japanese Appln. No. 2023-121387, dated Sep. 28, 2023, 5 pages (with English translation).

Office Action in Korean Appln. No. 10-2023-7006266, dated Nov. 3, 2023, 7 pages (with English translation).

Office Action in Japanese Appln. No. 2023-510444, dated Jun. 19, 2023, 7 pages (with English translation).

Office Action in Korean Appln. No. 10-2023-7006266, dated Jul. 9, 2023, 16 pages (with English translation).

Wikipedia, Bounding volume hierarchy, https://en.wikipedia.org/wiki/Bounding_volume_hierarchy, Oct. 16, 2020, 4 pages.

Wikipedia, Connected-component labeling, https://en.wikipedia.org/wiki/Connected-component_labeling, Aug. 12, 2020, 10 pages.

Wikipedia, Curse of dimensionality, https://en.wikipedia.org/wiki/Curse_of_dimensionality, Aug. 12, 2020, 6 pages.

Wikipedia, Epipolar geometry, https://en.wikipedia.org/wiki/Epipolar_geometry, Aug. 12, 2020, 4 pages.

Wikipedia, Foeground detection, https://en.wikipedia.org/wiki/Foreground_detection, Aug. 12, 2020, 11 pages.

Wikipedia, Octree, https://en.wikipedia.org/wiki/Octree, Aug. 12, 2020, 5 pages.

Wikipedia, Triangulation (computer vision), https://en.wikipedia.org/wiki/Triangulation_(compter_vision), Aug. 12, 2020, 5 pages.

Brenton Bailey, "Real Time 3D motion tracking for interactive computer simulations", https://www.imperial.ac.uk/pls/portallive/docs/1/20673697.PDF; Jun. 2007, 74 pages.

International Application Serial No. PCT/EP2021/072732, Notification of Transmittal of the International Search Report and the Written Opinion of the International Searching Authority, mailed Dec. 1, 2021, 16 pages.

Kim et al., "Multiple Hypothesis Tracking Revisited", 2015 IEEE International Conference on Computer Vision (ICCV), 2015, pp. 4696-4704, doi: 10.1109/ICCV.2015.533.

Motion-Based Multiple object Tracking—Matlab & Simulink—MathWorks Nordic, https://se.mathworks.com/help/vision/examples/motion-based-multiple-object-tracking.html, Aug. 12, 2020, 8 pages.

Qazi et al., "Automated Ball Tracking in Tennis Videos", IEEE Computer Society, 2015 Third International Conference on Image Information Processing, 2015, pp. 236-240.

(56) References Cited

OTHER PUBLICATIONS

Takahashi et al., "Visualization of putting trajectories in live golf broadcasting", ACM, SIGGRAPH '19 Talks, https://doi.org/10.1145/3306307.3328148, Jul. 28, 2019, 2 pages.
Using Kalman Filter for Object Tracking—Matlab & Simulink—MathWorks Nordic, https://se.mathworks.com/help/vision/examples/using-kalman-filter-for-object-tracking.html, Aug. 12, 2020, 10 pages.
Wang et al., "Tracking a Golf Ball With High-Speed Stereo Vision System", IEEE Transactions on Instrumentation and Measurement, vol. 68, No. 8, Aug. 2019, pp. 2742-2754.

* cited by examiner

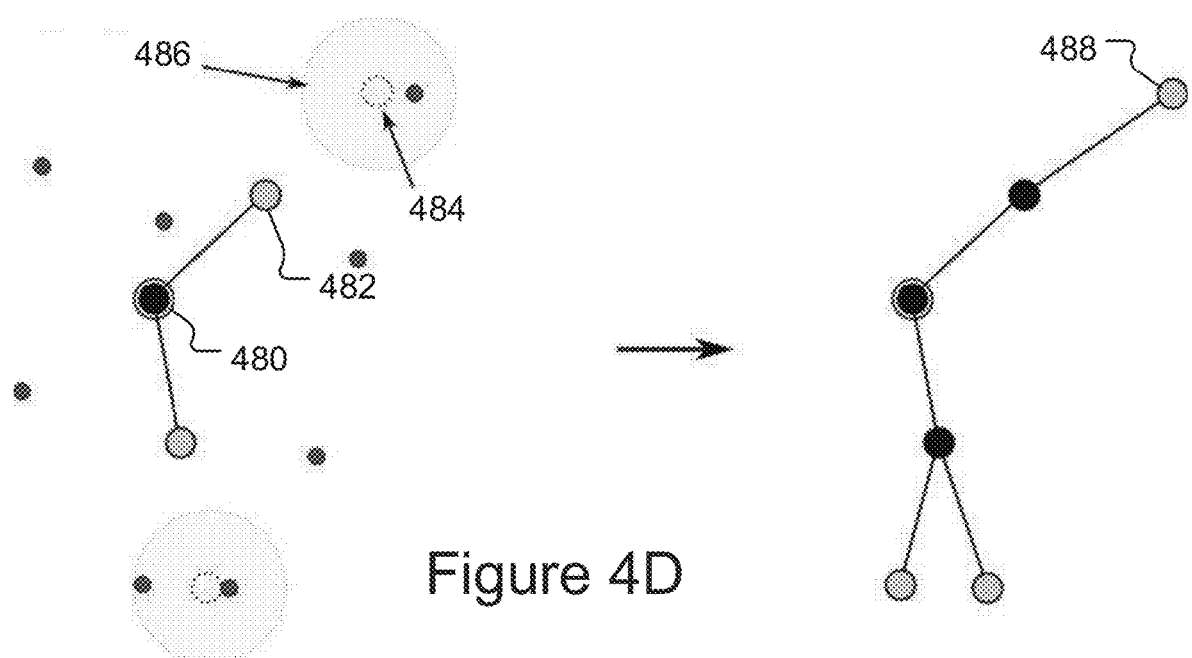

MOTION BASED PRE-PROCESSING OF TWO-DIMENSIONAL IMAGE DATA PRIOR TO THREE-DIMENSIONAL OBJECT TRACKING WITH VIRTUAL TIME SYNCHRONIZATION

CROSS-REFERENCE TO RELATED APPLICATIONS

This application is a continuation of U.S. patent application Ser. No. 17/745,176, filed on May 16, 2022, and issuing as U.S. Pat. No. 11,557,044 on Jan. 17, 2023, which is a continuation of U.S. patent application Ser. No. 17/404,953, filed on Aug. 17, 2021, and issued as U.S. Pat. No. 11,335,013 on May 17, 2022, which is a continuation of International Application No. PCT/EP2021/072732, filed on Aug. 16, 2021, which claims priority to U.S. Provisional Application Ser. No. 63/065,872, filed on Aug. 14, 2020. The aforementioned patent applications are hereby incorporated by reference in their entireties.

BACKGROUND

This specification relates to tracking an object in motion, such as a golf ball in flight, using data obtained from different sensors, which can employ different sensor technologies.

Systems and methods for tracking the flight of a golf shot with sensors include launch monitors, full flight two-dimensional (2D) tracking, and full flight three-dimensional (3D) tracking. Commonly used sensor types are cameras, Doppler radar, and phased array radar. The launch monitor method is based on measuring a set of parameters that can be observed during the swing of the golf club and the first few inches of ball flight after the club has impacted the ball. The measured parameters are then used to extrapolate an expected ball flight using mathematics and physics modeling.

In contrast, full flight 3D tracking systems are characterized by a design that attempts to track the full flight of the golf shot, rather than extrapolating from launch parameters. In addition, full flight 2D tracking systems track the shape of a golf shot, as seen from a particular angle, but will not produce 3D information and generally cannot be used to determine key parameters, such as the distance the ball traveled. Full flight 3D tracking using a combination of camera and Doppler radar data has been described in U.S. Pat. No. 10,596,416. Finally, full flight 3D tracking using stereo cameras that have their image frame acquisitions synchronized with each other has been described as potentially usable in some contexts for 3D tracking of objects.

SUMMARY

This specification describes technologies relating to tracking an object in motion, such as a golf ball in flight, using data obtained from at least one camera.

In general, one or more aspects of the subject matter described in this specification can be embodied in one or more methods that include: receiving, at one or more first computers, image frames from a camera via a first communications channel coupling the camera with the one or more first computers, the first communications channel having a first data bandwidth; identifying, by the one or more first computers, locations of interest in the image frames; finding sequences of the locations identified in the image frames, wherein each of the sequences satisfies a motion criterion for locations identified in at least three image frames from the camera; sending output data for the sequences of the locations, wherein the output data includes, for each location in each sequence, a two-dimensional position of the location in a specific image frame having a timestamp; receiving, at one or more second computers, the output data from the one or more first computers via a second communications channel coupling the one or more first computers with the one or more second computers, the second communications channel having a second data bandwidth that is less than the first data bandwidth; processing, by the one or more second computers, at least one of the sequences in the output data by interpolating between specified two-dimensional positions in specific image frames for the at least one of the sequences, using the timestamps of the specific image frames, to produce a virtual two-dimensional position at a predetermined point in time; and constructing a three-dimensional track of a ball in motion in three-dimensional space using the virtual two-dimensional position and position information obtained from at least one other sensor for the predetermined point in time.

The finding and the sending can be performed by the one or more second computers, and the locations identified in the image frames can be received at the one or more second computers from the one or more first computers via the second communications channel. Alternatively, the finding and the sending can be performed by the one or more first computers, and the output data can be received at the one or more second computers from the one or more first computers via the second communications channel.

The finding can include forming rooted trees from the locations of interest including: establishing root nodes of the rooted trees from respective first identified locations of interest in response to each of the first identified locations of interest having image data values that satisfy a tree initiation criterion; adding second identified locations of interest as sub-nodes of the rooted trees in response to at least some respective ones of the second identified locations being within a distance threshold of a location identified in a previous image frame that has been added to at least one of the rooted trees; and confirming each respective sequence of identified locations for output when the rooted tree of the sequence has a tree depth greater than two.

The sending can include delaying outputting of data for a given image frame and its locations of interest found in one or more of the sequences, until no further locations of interest identified for the given image frame can be included in any of the sequences based on locations of interest identified in subsequent image frames. The sending can include: outputting data for the image frames as the identifying is completed for each respective image frame; and outputting data for each location of interest only after finding one or more of the sequences include the location of interest to be output.

The camera can include a rolling shutter camera, the output data can include a time offset value for each location of interest included in each sequence, and the processing can include: calculating a first time of observation for a first location having one of the specified two-dimensional positions in the specific image frames by adding a first time offset value for the first location to the timestamp of a first of the specific image frames; calculating a second time of observation for a second location having another one of the specified two-dimensional positions in the specific image frames by adding a second time offset value for the second location to the timestamp of a second of the specific image frames; and performing the interpolating using the first time of observation and the second time of observation.

The constructing can include: combining, by the one or more second computers, the virtual two-dimensional position with the position information obtained from the at least one other sensor to form a three-dimensional position of an object of interest; adding, by the one or more second computers, the three-dimensional position of the object of interest to other three-dimensional positions of objects of interest in a cloud of three-dimensional positions of objects of interest for the predetermined point in time; performing, by the one or more second computers, motion analysis across multiple clouds of three-dimensional positions to construct the three-dimensional track of the ball in motion in three-dimensional space, wherein each of the multiple clouds is for a single point in time, and the multiple clouds include the cloud of three-dimensional positions of objects of interest for the predetermined point in time; and outputting for display the three-dimensional track of the ball in motion in three-dimensional space.

The camera can be a first camera, the at least one other sensor can be a second camera, the position information can include multiple two-dimensional positions obtained from the second camera, and the combining can include: excluding at least one, but not all of the multiple two-dimensional positions obtained from the second camera as not able to form a three-dimensional point with the virtual two-dimensional position obtained from the first camera; and triangulating at least the three-dimensional position of the object of interest using the virtual two-dimensional position obtained from the first camera, at least one of the multiple two-dimensional positions obtained from the second camera, intrinsic calibration data for the first camera and the second camera, and extrinsic calibration data for the first and second cameras.

The excluding can include: determining a region about at least a portion of an epipolar line in an image plane of the second camera using the virtual two-dimensional position, an optical center of the first camera, an optical center of the second camera, a baseline between the first and second cameras, and the extrinsic calibration data for the first and second cameras; and rejecting pairings of the virtual two-dimensional position obtained from the first camera with respective ones of the multiple two-dimensional positions obtained from the second camera in response the respective ones of the multiple two-dimensional positions being outside the region about the at least a portion of the epipolar line in the image plane of the second camera.

The one or more first computers can include a first processing unit and at least one additional processing unit, the first communications channel couples the camera with the first processing unit, receiving the image frames can include receiving the image frames at the first processing unit, identifying the locations of interest can include identifying the locations of interest at the first processing unit, finding the sequences can include finding the sequences at the at least one additional processing unit responsive to receiving the locations from the first processing unit via a third communications channel coupling the first processing unit with the at least one additional processing unit, and sending the output data can include sending the output data from the at least one additional processing unit, and wherein the third communications channel has a third data bandwidth that is less than the first data bandwidth but more than the second data bandwidth.

One or more aspects of the subject matter described in this specification can be embodied in one or more systems that include: at least one sensor including a camera and one or more first computers including a first hardware processor and a first memory coupled with the first hardware processor, the first memory encoding instructions configured to cause the first hardware processor to perform first operations including receiving of image frames, identifying of locations of interest, finding of sequences and sending of output data, in accordance with the methods described in this document; at least one other sensor; and one or more second computers including a second hardware processor and a second memory coupled with the second hardware processor, the second memory encoding instructions configured to cause the second hardware processor to perform second operations including receiving of the output data, processing of the sequences and constructing a three-dimensional track, in accordance with the methods described in this document.

The at least one other sensor can include a radar device. The at least one other sensor can include a second camera. Moreover, one or more aspects of the subject matter described in this specification can be embodied in one or more non-transitory computer-readable mediums encoding instructions that cause data processing apparatus associated with a camera to perform operations in accordance with the methods described in this document.

Various embodiments of the subject matter described in this specification can be implemented to realize one or more of the following advantages. Object detection can be performed close to the camera on raw image (uncompressed) data, which facilitates the use of a higher resolution camera, potentially with a higher frame rate and/or a higher bit depth, which enables higher quality 3D tracking. Ball location data can be effectively compressed to reduce the bandwidth requirements for sending data to be used in 3D tracking, without losing information relevant to high quality, downstream 3D tracking. Possible paths of an object can be represented using rooted trees (connected, acyclic graphs, each having a root node) and these rooted trees can be used to (in effect) eliminate noise by only exporting nodes of the trees that belong to branches of a certain depth.

Further, the constraints used in 2D tracking in image data can be loosened, both in terms of pre-filtering to identify candidate balls and in terms of modeling expected movement of a ball in 2D space, in order to pass more usable data to the 3D tracker without overwhelming the bandwidth of the communications connection to the 3D tracker's computer. The downstream 3D tracking component can be designed to handle large amounts of false positives, thus providing a good ability to filter out noise and find the actual objects to be tracked (e.g., the golf balls). With such filtering out of false positives by the 3D tracking component, the constraints in the 2D tracker can be substantially simplified and loosened, providing the benefit of making the 2D tracker easier to write and maintain as compared to a 2D tracker that uses tighter constraints that have to be calibrated to produce few false positives but still find all true positives.

Moreover, the separation of the 3D tracking task into several sequential processes, where the main inter-process communication is flowing in a single direction, and where each processing step reduces the required bandwidth to downstream components, and each process can run on a separate computer, provides substantial flexibility in designing and deploying a 3D object motion tracking system, especially if the distance between cameras and/or computing resources is substantial. In addition, the pre-processing done to identify candidate balls and model expected movement of a ball in 2D space enables downstream (post image capture) virtual time synchronization of measured object positions in time and space, thus avoiding the need to actually synchronize the camera images with other sensor(s) at the point of data capture. Triangulation between the points from different sensors (e.g., different cameras) is possible even though the original capture was not synchronous. Finally, the virtual time synchronization is enabled for rolling shutter cameras, enabling high quality triangulation at a second computer (during a post-processing stage) using data from both rolling shutter camera(s) and global shutter camera(s).

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIGS. 4A-4D show examples of a process that finds sequences of object locations that satisfy a motion criterion.

Like reference numbers and designations in the various drawings indicate like elements.

DETAILED DESCRIPTION

Figure 1A:
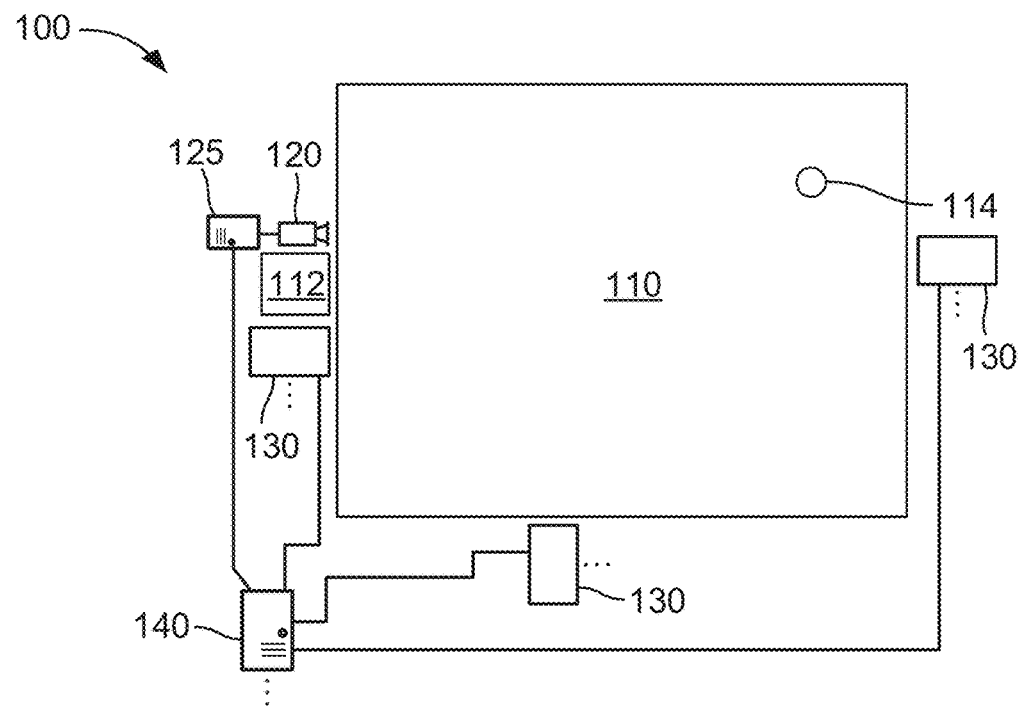
FIG. 1A shows an example of a system that performs motion based preprocessing of two-dimensional (2D) image data followed by three-dimensional (3D) object tracking of an object in motion through a three dimensional space.

FIG. 1A shows an example of a system 100 that performs motion based preprocessing of two-dimensional (2D) image data followed by three-dimensional (3D) object tracking of an object in motion through a 3D space 110. The object to be tracked can be a golf ball or another type of object that is struck, kicked or thrown (e.g., a baseball, a soccer ball, or a football/rugby ball). In some implementations, the 3D space 110 is a golf range, a grass field, or another open area into which objects can be launched. For example, the 3D space 110 can be part of a golf entertainment facility that includes one or more targets 114, a building including golf bays, each including at least one tee area 112 (more generally, a launch area 112), and potentially other entertainment as well as dining options.

In some implementations, the 3D space 110 is a playing area for a sport, such as a golf course, where the launch area 112 can be the golf tee for a particular hole on the golf course, or an intermediate landing point for a golf ball in play on the course, and the target 114 can be the cup at the end of the particular hole on the golf course or an intermediate landing point for a golf ball in play on the course. Other implementations are also possible, such as the launch area 112 being one of multiple designated tee areas along a tee line where golfers can hit golf balls into an open field 110, or the launch area 112 being one of multiple designated tee areas in the stands at a sports stadium where golfers can hit golf balls over and onto the playing field 110 of the sports stadium.

The system 100 includes two or more sensors 130, including at least one camera 120 and its associated computer 125. One or more of the sensors 130 (including the at least one camera 120 and its associated computer 125) can be located close to the launch area 112 for the object to be tracked, but this need not be the case. In some implementations, one or more sensors 130 (including the camera 120 and computer 125) can be located along one or both sides of the 3D space 110, and/or on the other side of the 3D space 110 opposite the launch area 112. For example, at a golf tournament, the camera 120 and computer 125 can be located behind the green, looking back at the golfer, assuming that shots will be hit towards the green. Thus, in various implementations, the sensors 130 can observe and track objects that move away from a sensor 130, toward a sensor 130, and/or through the field of view of a sensor 130 (note that each set of three dots in sequence in a figure indicates one or more additional instances of the sensor, computer, communications channel, etc. can also be included).

Figure 1B:
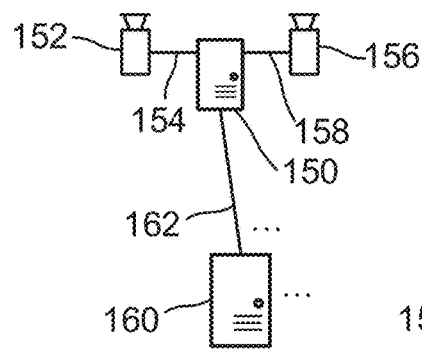
FIGS. 1B-1D show examples of different sensor and computer configurations, as can be used in the system of FIG. 1A.
Figure 1C:
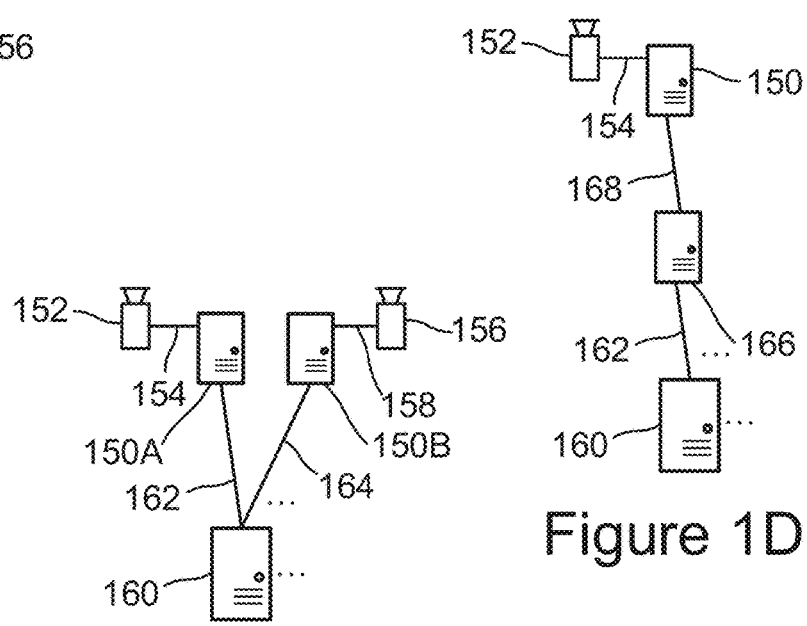
Figure 1D:
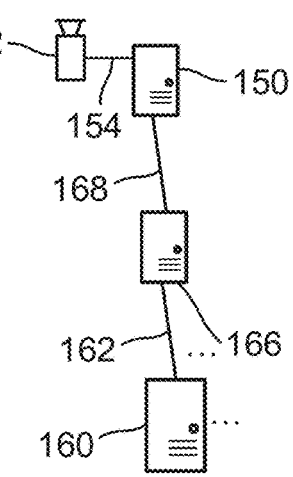

The sensors 130 can include cameras (e.g., stereo camera pairs), radar devices (e.g., single antenna Doppler radar devices), or combinations thereof, including potentially a hybrid camera-radar sensor unit, as described in U.S. Pat. No. 10,596,416. Nonetheless, at least one of the sensors 130 is a camera 120 and its associated computer 125, which are connected by a communications channel. FIGS. 1B-1D show examples of different sensor and computer configurations, as can be used in the system of FIG. 1A.

FIG. 1B shows an example of a pair of cameras 152, 156 that are connected to a first computer 150 through first communications channels 154, 158 having a first data bandwidth that is higher than that of at least one other communications channel used in the system. For example, the first communications channels 154, 158 can employ one or more high bandwidth, short distance data communication technologies, such as Universal Serial Bus (USB) 3.0, Mobile Industry Processor Interface (MIPI), Peripheral Component Interconnect eXtended (PCIx), etc. As described in further detail below, the pre-processing of image data from camera(s) 152, 156 can be performed close to the camera at one or more first computers 150, and once the pre-processing at the first computer(s) 150 has reduced the data bandwidth, the output of this pre-processing can be sent over a second communications channel 162 having a second data bandwidth that is less than the first data bandwidth. Thus, the second communications channel 162 can employ one or more lower bandwidths, longer distance data communication technologies, such as copper Ethernet or wireless data connections (e.g., using WiFi and/or one or more mobile phone communication technologies).

This is significant because it allows the system to be implemented with higher resolution camera(s) 120, 152, 156 and with computer(s) 125, 150 that operate on raw image (uncompressed) data from these camera(s) 120, 152, 156. Note that, whether using stereo camera tracking or hybrid camera/radar tracking, using a higher resolution camera with a higher frame rate enables higher quality 3D tracking, but only if the data can be efficiently and effectively processed. Furthermore, if the object tracking is intended to work for very small objects (e.g., the object may show up in only a single pixel of even a high resolution camera image) the object detection may need to have access to raw image (uncompressed) data since using traditional lossy video compression techniques (MPEG and similar) may remove valuable information about small objects from the images.

To address these issues, the first computer(s) 150 can perform pre-processing on the image data (including object detection and optionally 2D tracking) close to the camera(s) 152, 156 to reduce the bandwidth requirements for sending sensor data to one or more second computers 160 over the second communications channel 162. In addition, the pre-processing (as described in this document) enables downstream (post image capture) virtual time synchronization of measured object positions in time and space, allowing 3D tracking to be performed at second computer(s) 160 using the data received over the one or more second communication channels 162. This allows the downstream processing to be readily performed at a remote server because, after the pre-processing, the data bandwidth is so low that it is trivial to send the data over long distances.

Note that this can provide significant advantages when setting up the system 100 due to the flexibility it provides. For example, in the case of a golf competition television (TV) broadcast, where the system 100 can be used to track golf balls through the 3D space of the golf course and overlay a trace of the golf ball in a TV signal produced for live transmission, or for recording, the sensors 130 may be deployed a mile or more from the TV production facilities (where the 3D tracking computer 160 may be positioned). Note that the translation of ball positions (identified during the 3D tracking) to corresponding positions in video data obtained by the TV camera (allowing the trace overlay of a graphical representation of the ball's flight path onto the video data) can be performed using known homography techniques. As another example, in the case of a golf entertainment facility, the 3D tracking computer (e.g., a server computer 140, 160) need not be located in the same facility, and the 3D tracking performed by this computer (e.g., to augment other data or media, such as showing the path of the golf ball in a computer representation of the physical environment in which the golfer is located, or in a virtual environment that exists only in the computer) can be readily transferred to another computer (e.g., failover processing).

Various sensor and computer configurations are possible. FIG. 1C shows an example in which each camera 152, 156 has a dedicated first computer 150A, 150B, and the computers 150A, 150B communicate their respective, pre-processed data to the second computer(s) 160 over separate, second communication channels 162, 164. Thus, the cameras (or other sensor technology) can either share or not share first computer resources. In addition, the pre-processing can be split up and performed at different computers.

FIG. 1D shows an example in which the camera 152 is coupled with the computer 150 over a first communications channel 154 having a first data bandwidth, the first computer 150 is coupled with a third computer 166 over a third communications channel 168 having a third data bandwidth, and the third computer 166 is coupled with the second computer 160 over the second communications channel 162 having the second data bandwidth, where the second data bandwidth is less than the first data bandwidth, and the third data bandwidth that is less than the first data bandwidth but more than the second data bandwidth. The first computer 150 performs the object detection, the third computer 166 performs the 2D tracking of the object, and the second computer 160 performs the virtual time synchronization and 3D tracking of the object. Moreover, in some implementations, the first computer 150 performs the object detection and pre-tracking in 2D (using very simple/loose constraints), the third computer 166 performs more thorough 2D tracking, and the second computer 160 performs the virtual time synchronization and 3D tracking of the object.

Other sensor and computer configurations are also possible, consistent with the disclosure of this document. For example, the first computer 150 can perform the object detection (with pre-tracking in 2D (using very simple/loose constraints) or with no 2D tracking of the object), and a same second computer 160 can perform 2D tracking of the object (more thorough 2D tracking after a pre-tracking in 2D or all 2D tracking), the virtual time synchronization and 3D tracking of the object, rather than using an intermediate third computer 166 to perform the 2D tracking of the object. Conversely, one or more further intermediate computers can be used in some implementations. For example, the system can employ four separate computers to perform each of the following four operations: object detection, 2D tracking, virtual time synchronization, and 3D tracking. As another example, the system can employ five separate computers to perform each of the following five operations: object detection, pre-tracking in 2D (using very simple/loose constraints), more thorough 2D tracking, virtual time synchronization, and 3D tracking. Other configurations are possible, provided that at least one of the operations occurs at a first computer communicatively coupled with at least one camera through a first communications channel, and at least one other of the operations occurs at a second computer communicatively coupled with the first computer through a second communications channel having a data bandwidth that is less than the data bandwidth of the first communications channel.

Figure 2:
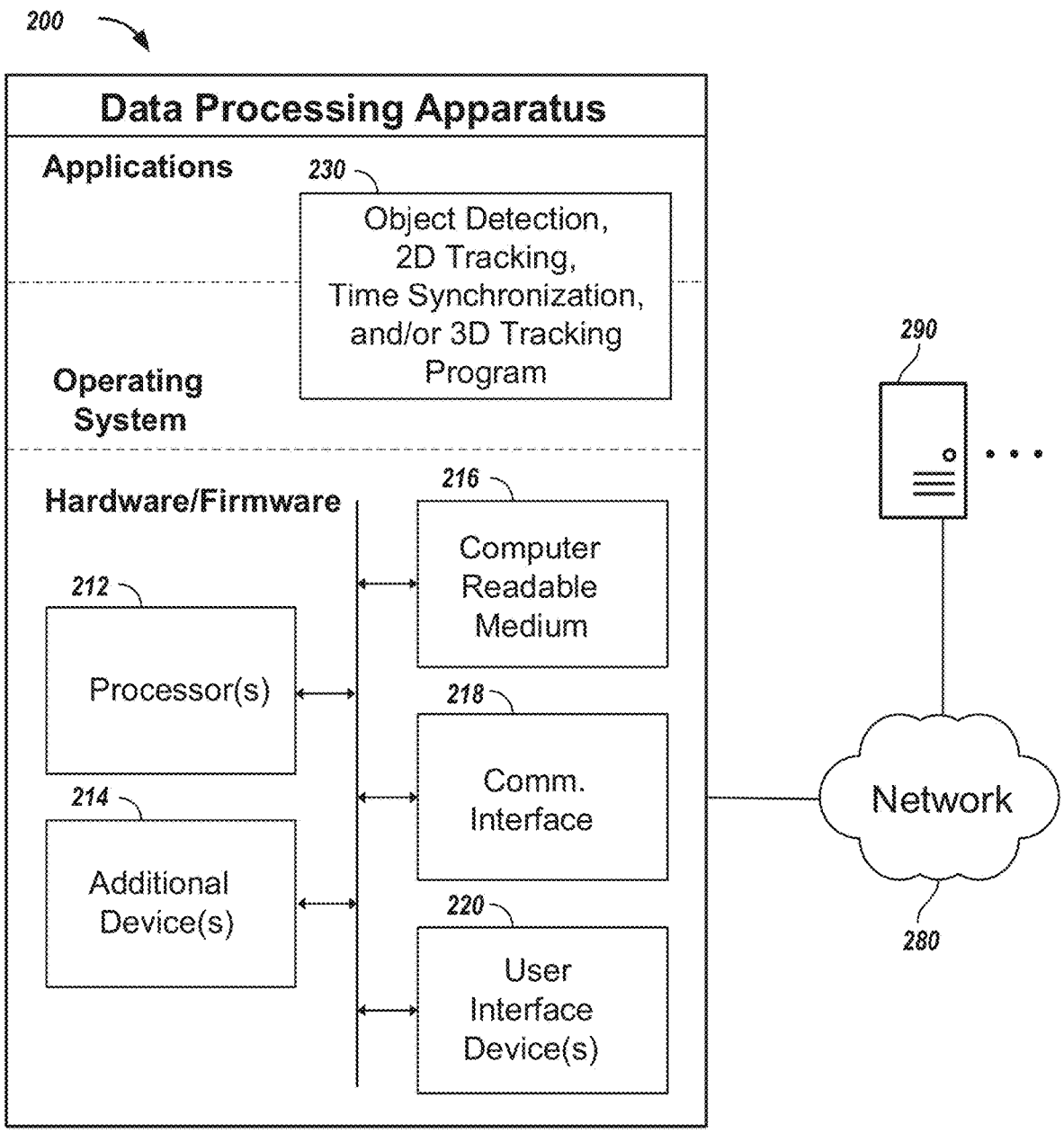
FIG. 2 is a schematic diagram of a data processing system including a data processing apparatus.

Various types of computers can be used in the system. The essential elements of a computer are a processor for performing instructions and one or more memory devices for storing instructions and data. As used herein, a "computer" can include a server computer, a client computer, a personal computer, embedded programmable circuitry, or a special purpose logic circuitry. FIG. 2 is a schematic diagram of a data processing system including a data processing apparatus 200, which represents an implementation of a first computer 150, a second computer 160, or a third computer 166. The data processing apparatus 200 can be connected with one or more computers 290 through a network 280.

The data processing apparatus 200 can include various software modules, which can be distributed between an applications layer and an operating system. These can include executable and/or interpretable software programs or libraries, including a program 230 that operates as an object detection program (e.g., in first computer 150), a 2D tracking program (e.g., in first computer 150 and/or third computer 166), a virtual time synchronization program (e.g., in second computer 160), and/or a 3D tracking program (e.g., in second computer 160), as described in this document. The number of software modules used can vary from one implementation to another. Also, in some cases, e.g., a 2D tracking program 230, the program 230 can be implemented in embedded firmware, and in other cases, e.g., a time synchronization and 3D tracking program 230, the program 230 can be implemented as software modules that are distributed on one or more data processing apparatus connected by one or more computer networks or other suitable communication networks.

The data processing apparatus 200 can include hardware or firmware devices including one or more hardware processors 212, one or more additional devices 214, a non-transitory computer readable medium 216, a communication interface 218, and one or more user interface devices 220.

The processor 212 is capable of processing instructions for execution within the data processing apparatus 200, such as instructions stored on the non-transitory computer readable medium 216, which can include a storage device such as one of the additional devices 214. In some implementations, the processor 212 is a single or multi-core processor, or two or more central processing units (CPUs). The data processing apparatus 200 uses its communication interface 218 to communicate with one or more computers 290, for example, over the network 280. Thus, in various implementations, the processes described can be run in parallel or serially, on a single or multi-core computing machine, and/or on a computer cluster/cloud, etc.

Examples of user interface devices 220 include a display, a touchscreen display, a speaker, a microphone, a tactile feedback device, a keyboard, and a mouse. Moreover, the user interface device(s) need not be local device(s) 220, but can be remote from the data processing apparatus 200, e.g., user interface device(s) 290 accessible via one or more communication network(s) 280. The data processing apparatus 200 can store instructions that implement operations as described in this document, for example, on the non-transitory computer readable medium 216, which can include one or more additional devices 214, for example, one or more of a floppy disk device, a hard disk device, an optical disk device, a tape device, and a solid state memory device (e.g., a RAM drive). Moreover, the instructions that implement the operations described in this document can be downloaded to the non-transitory computer readable medium 216 over the network 280 from one or more computers 290 (e.g., from the cloud), and in some implementations, the RAM drive is a volatile memory device to which the instructions are downloaded each time the computer is turned on.

Figure 3:
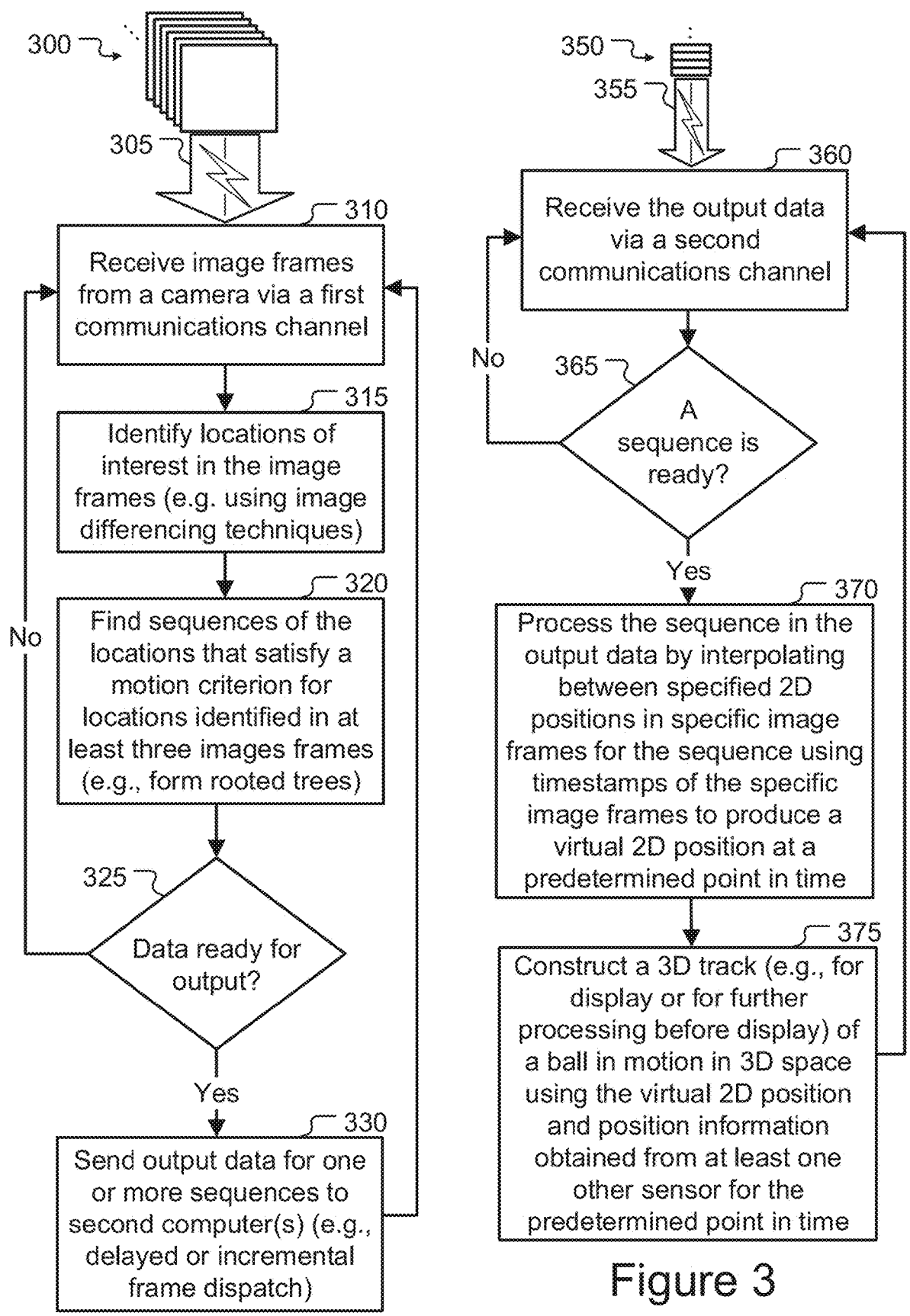
FIG. 3 shows an example of processes performed at different computers to detect objects, track the objects in 2D, produce virtual 2D positions for time synchronization, and construct 3D tracks of the objects in motion.

FIG. 3 shows an example of processes performed at different computers to detect objects, track the objects in 2D, produce virtual 2D positions for time synchronization, and construct 3D tracks of the objects in motion. The processes of FIG. 3 include pre-processing operations 310-330 performed at one or more first computers (e.g., computers 125, 150, 166 in FIGS. 1A-1D) and additional processing operations 360-375 performed at one or more second computers (e.g., computers 140, 160 in FIGS. 1A-1D). The pre-processing operations can include object detection and 2D tracking that effectively compresses ball location data (to reduce the bandwidth requirements for sending data to be used in 3D tracking) in a manner that enables virtual time synchronization of measured object positions during the additional processing at the second computer(s).

Thus, image frames 300 are received 310 (e.g., by a computer 125, 150) from a camera via a first communications channel 305 coupling the camera with the first computer(s), where the first communications channel 305 through which the image frames 300 are received has a first data bandwidth. For example, the first communications channel 305 can be a USB 3.0, MIPI, or PCIx communications channel, e.g., communications channel(s) 154, 158. Note that the bandwidth requirement between the camera and the computer can readily exceed 1 Gigabits per second (Gbps), e.g., a 12 megapixel (MP) camera running at 60 frames per second (FPS) and 12 bits per pixel needs a bandwidth of more than 8 Gbps.

Moreover, multiple such cameras used in combination may require a total bandwidth of 10-100 Gbps, which would put a serious strain even on Ethernet communication hardware. Furthermore, stereo setups (e.g., stereo cameras 152, 156 in FIG. 1B) sometimes require a significant distance between the cameras, or between the cameras and computer infrastructure, such as server rooms or cloud based computing, making high bandwidth communication even more challenging when long cables and/or communication over internet is required. As noted above, traditional video compression techniques, such as MPEG technology, may not be a suitable way of reducing bandwidth, especially when tiny objects (e.g., a distant golf ball) are to be tracked, since the objects to be tracked are at risk of being removed by traditional video compression. Thus, a high bandwidth communications channel 305 is used (for video frames from one or more cameras) allowing high resolution, high bit depth, and/or uncompressed image data to be received 310 as input to the object detection process.

Locations of interest are identified 315 (e.g., by a computer 125, 150) in the received image frames. For example, this can involve using image differencing techniques to identify each location in an image frame that has one or more image data values that change by more than a threshold amount from a prior image frame. In addition, other approaches are also possible. For example, the process can look for groups of pixels of a certain luminance or color (e.g., white for golf balls), look for shapes that match the shape of the objects to be tracked (e.g., a round or at least elliptical shape to find a round golf ball), and/or use template matching to search for the object (e.g., a golf ball) in the image.

Further, looking for locations that have one or more image data values that change by more than a threshold amount from one image frame to another image frame can include applying image differencing to find pixels or groups of pixels that change by more than the threshold amount. For example, image differencing can be applied to find pixels that change by more than a certain threshold value in each image, and groups of such changing pixels that are adjacent to each other can be found, e.g., using known connected-component labeling (CCL) and/or connected-component analysis (CCA) techniques. A group of such pixels (and potentially also a single pixel) that satisfy the object detection criteria is called a "blob", the location and size of each such blob can be stored in a list, and the list of all blobs in each image can be sent to the 2D tracking component. Turning an image into a list of object locations (or blobs) has a bandwidth reduction effect. In some cases, the bandwidth reduction of this operation may be 10:1 or more. But further bandwidth reduction can be achieved, as described in this document, which can provide a significant benefit when tiny objects are to be tracked.

In the case of tiny object tracking, there is a significant problem with false detections since it is difficult to discriminate tiny objects (possibly a single pixel in an image) based on features of the object. Thus, the identifying 315 (to detect objects of interest at specific locations in the camera images) can be implemented with a low threshold to favor zero false negatives, while allowing plenty of false positives. It is to be appreciated that this approach is generally counter intuitive in that false positives in object tracking is often disfavored, thus setting up a competition between minimizing both false positives and false negatives. But the present approach to object tracking readily accommodates false positives since the downstream processing is designed to handle large amounts of false positives. Nonetheless, because the object detection is designed to allow many false positives, more objects will be identified 315 in each image frame 300, including many "objects" that are just noise in the image data, thus partially offsetting the bandwidth reducing effect of turning an image into a list of objects.

Sequences of the locations identified in the image frames are found 320 (e.g., by a computer 125, 150, 160, 166). Note that the processes shown in FIG. 3 (and the other figures) are presented as sequential operations for ease of understanding, but in practice, the operations can be performed in parallel or concurrently, e.g., using hardware and/or operating system based multitasking, and/or using pipelining techniques. Pipelining can be used for concurrency, e.g., the object identification 315 can start processing frame n+1, if available, right after handing off frame n to the 2D tracking 320, without having to wait for downstream components to finish first. Thus, the disclosure presented in this document in connection with the figures is not limited to sequentially performing the operations, as depicted in the figures, except where the processes performed on respective computers are described as sequential processes, i.e., the object identification process, the 2D tracking process(es), and the virtual time synchronization and 3D tracking process(es) occur in sequence because each object identification and 2D tracking processing step reduces the bandwidth of data sent to downstream components.

Each of the sequences that are found 320 satisfies a motion criterion for locations identified in at least three image frames from the camera. In some implementations, the criterion is measured in relation to more than three frames and/or one or more criteria are used (e.g., the tree initiation criterion described below). In general, the 2D tracking tries to find sequences of objects (or blobs) over three or more frames that indicate object movement consistent with that of an object in Newtonian motion, unaffected by forces other than gravity, bouncing, wind, air resistance or friction.

The criterion for this object movement can be defined to include displacement, velocity, and/or acceleration in each dimension (x and y in the image) being inside a predefined range of values. This range of values is set so that the 2D motion and acceleration of an object in motion (e.g., a flying golf ball) as depicted by a 2D camera are well inside specified boundaries, whereas jerkier motion is rejected (absent a known object off which the object to be tracked can bounce). Moreover, because the larger system will employ a secondary tracking step in downstream processing, which can do more fine-grained filtering of what constitutes an actual object to be tracked, e.g., golf shots, the finding 320 need not be a perfect (or even close to perfect) filter that only accepts real object motion, such as that of a golf ball after being hit from a tee area 112.

Rather, the filtering done at 320 is intentionally made to be less than perfect, allowing objects other than objects in motion to be included in the found sequences, including potentially sequences of noise that are incorrectly identified 315 as an object of interest and then incorrectly found 320 to form a sequence. In other words, the finding 320 can implement a loose filter that increases false positives so as to minimize false negatives, e.g., all or close to all golf balls in motion will be accepted as forming a valid sequences at 320.

This looser (benefit of doubt) approach means that a much simpler tracking algorithm can be used at 320, knowing that it does not need to be perfect at discriminating desired objects (e.g., golf balls) from undesired objects (e.g., non-golf balls). The set of rules defining the tracking can be reduced to a minimum, and any mistakes made by the 2D tracking (as in letting a non-golf ball pass through) can be filtered out by the downstream components and processing. Instead of emitting entire trajectory paths, which each have one starting point and one ending point, the found 320 sequences can be represented by a "rooted tree" in which each vertex (node in the tree) is an observed blob (in x, y, and time t) and each edge is a possible movement between locations of an object whose motion is being tracked. Each such branch can also have some metadata such as the total depth of the tree, as is described in further detail in connection with FIG. 4A.

However, even with this looser (benefit of doubt/low threshold) approach, it is still possible that missed object detections will occur. Thus, dummy observations can be used to account for objects that should be in the image data but are not identified. In some implementations, if no sufficiently good blob is found that can extend a path, the 2D tracker can add a dummy observation at the predicted location. Dummy observations can be implemented with a significant penalty score and, in some implementations, dummy observations will not be allowed unless the graph is already at a certain depth. Since there are limits on how much penalty a branch can have, there are in practice limits on how many dummy observations a path may have.

Figure 4A:
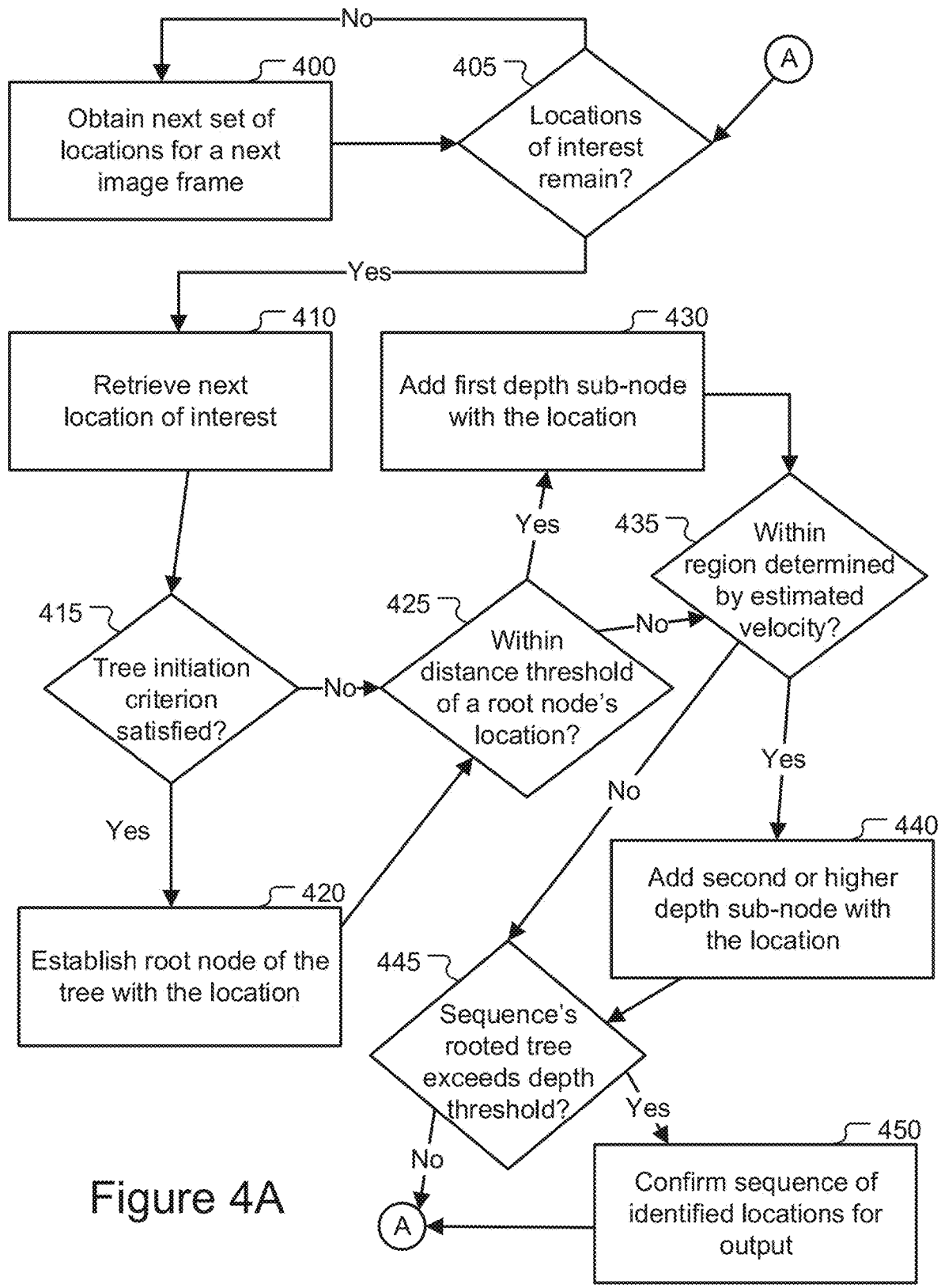

As noted above, the finding 320 can involve forming rooted trees from the locations of interest, where each rooted tree is a connected acyclic graph with a root node, which is the root of the tree, and every edge of the connected acyclic graph either directly or indirectly originates from the root. FIG. 4A shows an example of a process that finds sequences of object locations that satisfy a motion criterion by forming rooted trees. At 400, a next set of locations identified for an image frame is obtained for processing, and while locations of interest remain 405 in the set for the current frame, this processing continues. For example, when a frame of blobs is to be processed, all blobs in the new frame can be matched to all the tree nodes that were added during processing of the previous frame to see if the blob can be a possible continuation of that path, depending on how much the point in this branch looks like desired motion, as defined by the motion criterion.

Figure 4B:
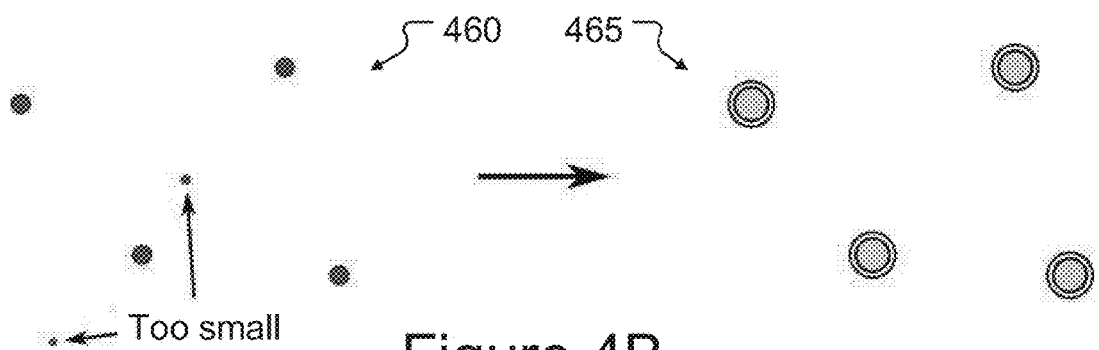

A next location of interest is retrieved 410 from the set, a check 415 is made to determine whether this location of interest satisfies a tree initiation criterion. If so, a root node of a new tree is established 420 using this location of interest. For example, if the image data values at the location of interest are larger than a minimum object size, then this can be used to indicate that a ball is close to the camera, and a new tree should be established. FIG. 4B shows a visual example of this, in which six blobs 460 are observed, but only four of these blobs 460 are large enough to be used to establish new root nodes 465. Note that one blob observation can be added to several trees, and every observed blob could in theory be the start of a new object observation. This can lead to a combinatorial explosion in noisy environments, and so in some implementations, some additional constraint (such as a minimum blob size constraint) is enforced before establishing a new tree.

In this example, all blobs that are larger than a certain minimum size are promoted to new trees of depth 0, where the minimum size limit can be set based on the camera resolution and the noise level of the incoming video. For example, the criterion can be that a blob must be at least 2 pixels (and not just a single pixel) to establish a new tree. Note that truly random noise affects the pixels individually and very rarely generates larger clusters in an image. Other approaches to avoiding a combinatorial explosion are also possible. For example, the noise thresholds in the blob generation (i.e., location identification) process can be adaptively adjusted.

Moreover, the minimum tree depth required for a path to be exported can be increased, which makes sure the amount of data exported is limited since random noise sequences rarely manage to build longer sequences just by chance. A lot of graphs with depth 0 and 1 will be generated, since the constraints are so generous, but most of these graphs will never reach depth 2 since the prediction is better then, and even fewer graphs will reach a depth of 3. Thus, statistics works to the benefit of the systems and techniques of this disclosure, as trees or branches get discarded when there are no more nodes that can be added to them.

In addition, in the case where the camera is located near the target, looking back toward the launch area of the object, i.e., when detecting incoming objects, different size thresholds can be applied in different parts of the image. For example, a minimum size of one pixel can be used in the portion (e.g., a rectangle) where a distant ball would be spotted, and a minimum size of two pixels can be used elsewhere. Thus, the criteria used to form the trees of possible object paths can be determined based on the location of the camera with respect to the launch area.

For example, if a somewhat flat ground plane can be presumed, and the camera location and aiming is known, all ball detections under the "horizon" of the ground plane can be "sanity" checked against an estimate of the maximum distance (and therefore minimum size) the ball can be at. A ray from the camera through the ball detection intersects the ground plane at some distance D. The ball must be at distance D or closer, or else it would be underground. For a random ball detection above the "horizon", there is no simple distance heuristic, since there is no ground plane intersection. However, if there is knowledge about the limits of the 3D space, e.g., the playing field, some general and/or angle dependent maximum distance/minimum object size constraint(s) can be used given that the object must be inside the 3D region of interest.

Figure 4C:
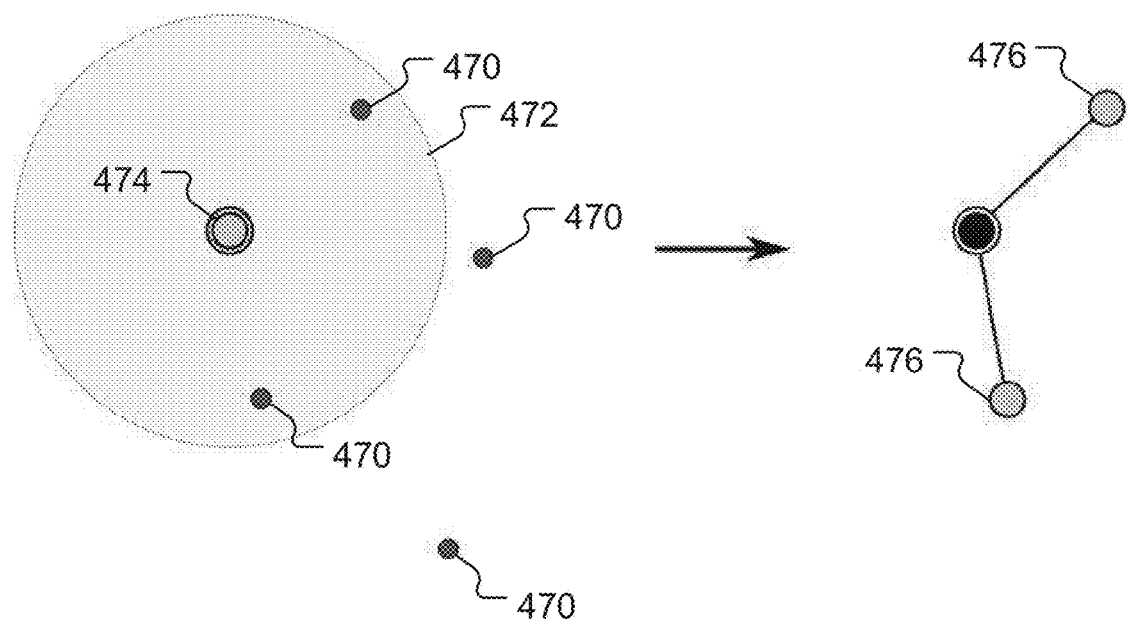

Returning to FIG. 4A, a check 425 is made to determine whether the current location of interest is within a distance threshold of an established root node for a location identified in a previous image frame. If so, the location of interest is added 430 as a first depth sub-node to this tree, under the tree's root node. Note that, if the tree is made up of only one vertex (depth=0), there is no way to estimate the velocity of that path yet, so it needs to be matched to any blob that is within a reasonable distance from the vertex. FIG. 4C shows a visual example of this, continued from FIG. 4B. Out of four observed blobs 470, only two blobs are within a distance limit 472 of a root node 474 from a previous frame. Thus, only two of the blobs 470 are added as first depth sub-nodes 476 to the rooted tree. In some implementations, the distance limit depends on the resolution and frame rate of the incoming sensor as well as the maximum expected velocity (perpendicular to the camera's aiming direction) of the object being tracked. If the size of the objects being tracked is known beforehand, as is the case with golf balls, this can be taken into account when determining the distance limit/threshold 472. Moreover, it can be presumed that a larger blob is closer to the camera than a smaller blob, which means that a larger movement between frames can be tolerated when there is a larger blob (either in the previous frame or the current frame, depending on the placement of the camera with respect to the expected direction of the objects being tracked).

However, when matching the blobs to a vertex at depth one or more, it is possible to predict where the next point in a path should be. In some implementations, the expected region of the next blob is calculated by presuming that the velocity is the same since the last frame. FIG. 4D shows a visual example of this. Based on root node 480 location and a first depth sub-node 482 location, plus the known frame rate of the camera, a predicted location 484 is calculated. A search area 486 (or region) around the predicted location 484 is then determined for use in looking for blobs to add to the tree. Similar to the details provided above for determining the distance limit/threshold 472, the size of the area/region 486 around the predicted location 484 can be determined based on the resolution of the camera and the maximum expected velocity (perpendicular to the camera's aiming direction) of the object being tracked, potentially adjusted in accordance with the known size of the object and the size of the blobs in the different image frames. Moreover, in some implementations, a Kalman filter can be used in creating predictions, e.g., when the order of the graph is large enough.

Any blob that is sufficiently close to the predicted location can be turned into a vertex and added to the tree. Thus, as shown in FIG. 4D, one blob is within the region 486 of the predicted location 484, and so this blob is added as a new sub-node 488. In addition, in some implementations, penalties can be accumulated on the tree branches, where the penalties add up to a score that is used to rank the branches, which can help in deciding the best branches to export. Further, in some implementations, the more a blob's location deviates from the expected coordinates, a higher penalty can be given to this branch.

In some implementations, penalties accumulated on the tree branches and can be used to both limit how large of a penalty is allowed and to determine when to discard branches. In the former case, if a branch already has a high penalty, it will not be allowed to add new nodes that would make the extended branch exceed the limit. When the penalty is calculated from the discrepancy between the predicted location and the actual location, this is essentially a way of making sure that the acceleration is within limits. If it is not, the penalty will get too high. In the latter case, when there are several branches that have the last 3 blobs in common, the branch that is deepest and has the lowest penalty can be kept and the other ones can be discarded. Note that this type of penalty-based hypothesis tracking can be applied to 3D tracking in addition to 2D tracking.

Returning to FIG. 4A, a check 435 is made to determine whether the current location of interest is within a region determined using an estimated velocity of a location used for a parent sub-node of an established tree. If so, the location of interest is added 440 as a second or higher depth sub-node to this tree, under the parent sub-node, such as described above in connection with FIG. 4D. In addition, in some implementations, when the depth of the tree increases, more sophisticated prediction algorithms can be used to get better predictions. By fitting the most recent nodes in the branch to a second or third order polynomial function, both a good prediction of where the next point would be can be obtained and paths with clearly unreasonable changes in acceleration can be discarded. Moreover, in some implementations, the observations can be provided to a Kalman filter, and the Kalman filter's model can be used to produce new predictions.

In addition, it should be noted that the same location of interest in a single image frame can be added as respective sub-nodes (of first or higher depths) to two or more rooted trees that are keeping track of potential object paths through the image frames, as well as potentially being used to establish a new root node of a new tree. Moreover, the same location of interest in a single image frame can be added as a sub-node in a tree with more than one linkage back to respective parent nodes in the tree, including the same sub-node having different depths depending on which linkage is followed back to the root node.

Thus, many false paths will be produced, and even though the downstream processing can filter out these false paths, there should still be a limitation on when the potential paths will be output. In some implementations, no sequence will be considered for output until the rooted tree representing the sequence exceeds 445 a predetermined tree depth. Thus, a sequence of identified locations is not output until the sequence is confirmed 450 for output based the tree depth for the sequence exceeding 445 the predetermined tree depth, as specified for a given implementation, or as determined on the fly based on one or more factors.

Note that only the portions of the rooted tree that have the predetermined tree depth need be confirmed 450 for output as sequences of identified locations. This helps to prevent noise, which produces false paths in the rooted trees, from being propagated from the 2D tracking in the pre-processing stage at a first computer to the post-processing stage at a second computer. Also, the minimum tree depth threshold will generally depend on the environment and the acceptable delay for producing a 3D track of the object. In some implementations, the rooted tree of the sequence must have a tree depth greater than two before the sequence is confirmed 450 for output. In some implementations, the tree depth must be greater than three, four, five, six or seven, before the sequence is confirmed 450 for output.

For example, in some implementations, vertices of a tree (corresponding to the blobs/location) are only exported if they are at a certain depth (D) in the tree, or if they have child nodes that are exported due the child nodes having the certain depth (D) in the tree. A vertex with D=5 has five edges between itself and the root. This means that the output might be delayed by the same number D of frames, since it often cannot be known beforehand if a blob will be part of a sufficiently long branch. It can be shown that the described filtering (via limiting export of tree nodes) dramatically reduces the bandwidth required to communicate object candidates since the only blobs exported are the ones that constitute possible paths. The below table shows an example of reduction in bandwidth for a golf application based on required minimum branch depth.

TABLE 1

| Required Depth | Data Reduction |
|---|---|
| 1 | 73% |
| 2 | 84% |
| 3 | 93% |
| 4 | 97% |
| 5 | 98% |
| 6 | 99% |

As this makes clear, the vast majority of all blobs/locations of interest are either not connected by any path or not connected by a path of sufficient depth, and thus most blobs/locations of interest are rejected by the effective filtering done in the pre-processing stage. Returning to FIG. 3, at 325, a check is made to determine if data for the sequences is ready for output, i.e., for any sequence of nodes in a tree that includes at least one node with a tree depth greater than the predetermined tree depth, as described above, the nodes of that sequence are ready for output. In such a case, output data for one or more sequences of locations is sent 330 (e.g., by a computer 125, 150, 166) to one or more second computers (e.g., a computer 140, 160). However, in some implementations, the identified 315 locations are sent from a first computer (e.g., by a computer 125, 150) to a second computer (e.g., computer 140, 160, 166) that finds 320 the sequences of the locations identified in the image frames and then outputs the sequences data to another process on the same computer or on a different computer. In any case, the sequence output data includes at least, for each location in each sequence, a two-dimensional position of the location in a specific image frame having a timestamp, which is needed for virtual synchronization at the second computer.

One of the fundamentals of 3D tracking is triangulation. However, triangulating the position of an object seen in two cameras requires that observations from the same time instance are at hand. A common way of achieving this is to use a common synchronous trigger signal for all cameras (e.g., transmitted through a cable). But this only works if the cameras have the same capture frame rate. In some setups, it is difficult or impossible to guarantee that the two cameras are in sync (triggering image captures in tandem), thus making triangulation of the observations from the different cameras difficult or impossible. To solve this problem, rather than attempting to actually synchronize the camera images with other sensor(s) at the point of data capture, timestamp information (in combination with information about the movement represented by the 2D path) is used for virtual synchronization at the second computer.

In addition, the systems and techniques described in this document are usable with both global shutter cameras and rolling shutter cameras. A rolling shutter means that the timing of the capture of each row in the camera image is different. So when an object is imaged by the sensor, the position of the object can be determined, but the time of the measurement depends on where in the image the object is found. In some implementations, there might be a time difference of approximately 20 milliseconds between the top and bottom image rows. This also produces a problem for triangulation, since the requirement of simultaneous measurement in both cameras may not be met. To solve this problem, the rolling shutter information is also taken into account by considering the relative time of the particular time offset of the 'location' within the frame, in addition to the timestamp of the frame, such that the measured object positions from rolling shutter cameras are also made usable for high quality triangulation at a second computer during the post-processing stage. For global shutter capture, this offset is always zero.

Since a number of frames of data may be required for a track to qualify for the minimum path length (minimum tree depth) requirement, such as described above in connection with Table 1, there is tradeoff between introducing a delay for all blobs, or implementing a more complex protocol that allows communicating already qualified blobs as soon as they are known. Thus, in some implementations, the sending 330 involves a delayed dispatch of both frame and blob data, and in some implementations, the sending 330 involves an incremental dispatch of the frame and blob data.

In the case of delayed dispatch, the sending 330 involves delaying outputting of data for a given image frame and its locations of interest found in one or more of the sequences, until no further locations of interest identified for the given image frame can be included in any of the sequences based on locations of interest identified in subsequent image frames. Thus, export of nodes for the frame can be done when the number of subsequent frames that have been processed excludes the predefined tree depth being reached for any more blobs in the current frame. In other words, the transmission of a frame is delayed until it is known that no further blobs identified in the frame will be included in a path in a rooted tree that has the required minimum tree depth.

Further, in some implementations, a dynamic minimum tree depth can be used. The minimum tree depth can be set low initially to minimize latency when there are few paths, and then dynamically increased if the load (total output of qualified paths per time unit) exceeds some maximum load threshold. This can provide a kind of throttling effect that improves performance by adjusting the processing in response to current input data.

In addition, the frame data structure can include a list of blobs that were detected in this frame and that passed the filter criteria. For example, the frame data structure can include the data fields shown in Table 2 below.

TABLE 2

| Name | Data Type | Description |
| --- | --- | --- |
| fn | int64 | Frame number according to video source |
| fn_prev | int64 | Frame number of previous frame. Will be fn + 1 unless there have been frames dropped upstream. |
| t_sync | int64 | Timestamp in microseconds. This timestamp is the one that should be used to correlate frames between cameras. |
| t_wall | int64 | Wall clock time expressed in microseconds elapsed since unix epoch |
| blobs | Blob[ ] | A list of blobs that was detected in this frame and that passed the filter criteria. |

Further, the Blob data structure included in the frame data structure can include the data fields shown in Table 3 below.

TABLE 3

| Name | Data Type | Description |
| --- | --- | --- |
| fn | int64 | Frame number where this blob was observed. |
| idx | int | Zero based index of blob in frame. First blob transmitted gets #0, next one #1 etc . . . |
| x | float | x coordinate of blob |
| y | float | y coordinate of blob |
| size | int | Number of pixels in blob |
| c | int8 | Blob contrast. Tells whether a blob is darker or brighter than the background model. |

TABLE 3-continued

| Name | Data Type | Description |
| --- | --- | --- |
| dt | int | Time offset (in microseconds) of blob within the frame, to handle rolling shutter effects. Actual time when the blob was observed is t_sync + dt. Should be 0 when using global shutter. |
| previous | int[ ] | Lists the indexes of all blobs in the previous frame that this blob is connected to. Empty if this is the root of the path tree. |

Note that these data structures can be encoded in various formats, such as in JSON format, as follows:

```
{"fn":25281,
"fn_prev":25280,
"t_sync":7430127868,
"t_wall":1587541719527486,
"blobs":[
 {"idx":0,"c":255,"dt":0,"prev":[0],"size":6,"x":939.5,"y":577.0},
 {"idx":1,"c":202,"dt":0,"prev":[1],"size":106,"x":973.625,"y":568.375},
 {"idx":2,"c":0,"dt":0,"prev":[2],"size":1,"x":681.0,"y":469.0},
 {"idx":3,"c":0,"dt":0,"prev":[4],"size":1,"x":2.5,"y":938.0},
 {"idx":4,"c":0,"dt":0,"prev":[5],"size":3,"x":0.875,"y":939.375},
 {"idx":5,"c":255,"dt":0,"prev":[6],"size":4,"x":959.75,"y":558.625},
 {"idx":6,"c":0,"dt":0,"prev":[6,7],"size":2,"x":949.5,"y":579.0},
 {"idx":7,"c":0,"dt":0,"prev":[8],"size":1,"x":678.75,"y":475.625},
 {"idx":8,"c":0,"dt":0,"prev":[8],"size":2,"x":677.625,"y":476.75},
 {"idx":9,"c":255,"dt":0,"prev":[9],"size":1,"x":433.0,"y":975.0},
 {"idx":10,"c":255,"dt":0,"prev":[10],"size":1,"x":410.5,"y":997.0},
 {"idx":11,"c":113,"dt":0,"prev":[11],"size":5,"x":411.75,"y":991.75},
 {"idx":12,"c":0,"dt":0,"prev":[12],"size":1,"x":407.5,"y":999.0},
 {"idx":13,"c":0,"dt":0,"prev":[13],"size":1,"x":410.5,"y":1012.0},
 {"idx":14,"c":0,"dt":0,"prev":[14],"size":1,"x":793.5,"y":599.0}
]}
```

For bandwidth constrained transmission, a more compact encoding can be used, such as Google's protocol buffers format.

When unfiltered blobs are passed between processing nodes, for instance if blob detection takes place in the edge device, while the pre-tracking and/or tracking is carried out on a different computer, a simplified format can be used, since there is no information anyways on the relationship between blobs of different frames. For example, the frame data structure can include the data fields shown in Table 4 below.

TABLE 4

| Name | Data Type | Description |
| --- | --- | --- |
| fn | int64 | Frame number according to video source |
| fn_prev | int64 | Frame number of previous frame. Will be fn + 1 unless there have been frames dropped upstream. |
| t_sync | int64 | Timestamp in microseconds. This timestamp is the one that should be used to correlate frames between cameras. |
| t_wall | int64 | Wall clock time expressed in microseconds elapsed since unix epoch |
| readout_duration | int32 | Number of microseconds between the start of the capture of the top raster line and the completion of the bottom raster line. For global-shutter sensors, this is zero. This can be negative if the readout was performed bottom-up rather than top-down. |
| n_rows | int16 | Number of rows (scan lines) in the frame. |
| n_columns | Int16 | Number of columns in the frame |
| blobs | SimpleBlob[ ] | A list of all blobs that was detected in this frame. |
| bitmap | byte[ ] | Contains a monochrome bitmap with n_rows × n_columns pixels. For each pixel, a 1 indicates that this pixel deviated from the noise model sufficiently to generate a blob, and a 0 means that the pixel was within the expected noise limits. Any standard image format that supports lossless storage of monochrome images can be |

TABLE 4-continued

| Name | Data Type | Description |
| --- | --- | --- |
| | | used, for instance Portable Network Graphics (PNG) Specification (Second Edition). This can also be a raw bit-packed array, possibly compressed using a reasonably fast lossless compression algorithm such as DEFLATE Compressed Data Format Specification version 1.3. The sender and recipient must agree on which format that is used in each particular implementation. |

Further, the SimpleBlob data structure included in the frame data structure can include the data fields shown in Table 5 below.

TABLE 5

| Name | Data Type | Description |
| --- | --- | --- |
| x | float | x coordinate of blob |
| y | float | y coordinate of blob |
| size | int | Number of pixels in blob |
| c | int8 | Blob contrast. Tells whether a blob is darker or brighter than the background model. |

In the case of incremental frame dispatch, the sending 330 involves outputting data for the image frames as the identifying 315 is completed for each respective image frame, and outputting 330 data for each location of interest only after finding 325 one or more of the sequences include the location of interest to be output. As discussed above, the sequence needs to have the necessary tree depth in order for a node to be exported, and when a tree reaches the threshold depth, all parent nodes (of the tree node surpassing the threshold depth) that have not earlier been exported (by some other branch) are then output 330 retroactively. This is a more complex approach for sending the data that can be used if low latency is required. The 2D tracking outputs a continuous stream with information about the frames that have been processed and lists of all blobs that have passed the ball candidate filtering (i.e., all identified 315 locations of interest) as soon as the information is available.

For example, when a new frame is processed, the information for the frame can be sent using the frame data structure with the fields of data shown in Table 6 below.

TABLE 6

| Name | Data Type | Description |
| --- | --- | --- |
| fn | int64 | Frame number according to video source. |
| fn_prev | int64 | Frame number of previous frame. Will be fn + 1 unless there has been frames dropped upstream. |
| t_sync | int64 | Timestamp in microseconds. This timestamp is the one that should be used to correlate frames between cameras |
| t_wall | int64 | Wall clock time expressed in microseconds elapsed since unix epoch. |

Further, the blob data structure can include the fields of data shown in Table 7 below.

TABLE 7

| Name | Data Type | Description |
| --- | --- | --- |
| fn | int64 | Frame number where this blob was observed. |
| idx | int | Zero based index of blob in frame. First blob transmitted gets #0, next one #1 etc . . . |

TABLE 7-continued

| Name | Data Type | Description |
| --- | --- | --- |
| x | float | x coordinate of blob |
| y | float | y coordinate of blob |
| size | int | Number of pixels in blob |
| c | int8 | Blob contrast. Tells whether a blob is darker or brighter than the background model. |
| dt | int | Time offset (in microseconds) of blob within the frame, to handle rolling shutter effects. Actual time when the blob was observed is t_sync + dt. Should be 0 when using global shutter. |

Moreover, each connection between blobs can be represented using a connection data structure including the fields of data shown in Table 8 below.

TABLE 8

| Name | Data Type | Description |
| --- | --- | --- |
| fn | int64 | Frame number of this blob. |
| idx | int | Index # in of the blob whose connections are listed. |
| prev | Array [int] | List of the indexes of all blobs in the previous frame that this blob is connected to in the paths fulfilling the criteria. |

The records generated using the above data structures can be put on the stream (from the first computer to the second computer) as soon as the information is established (the frames and blobs data can be sent 330 during and after the identifying 315, and the blob connections data can be sent 330 after a found 320 sequence formed by these blob connections has been confirmed 325 for output). It is guaranteed that every blob and frame that is referenced by a record will be put on the stream before the record that references it. However, in case the consumer starts reading mid-stream it might have missed the original declaration, so this issue should be addressed at the second computer.

Regardless of the data structures or output timing used, the output data 350 are received 360 (e.g., by a computer 140, 160) from the one or more first computers (e.g., from a computer 125, 150) via a second communications channel 355 coupling the first computer(s) with the second computer(s), where the second communications channel 355 through which the output data 350 is received has a second data bandwidth that is less than the first data bandwidth of the first communications channel 305. For example, the second communications channel 355 can be a copper Ethernet or wireless communications channel, e.g., communications channel(s) 162, 164. Further, in implementations where part of the pre-processing (e.g., the finding 320) is performed on the same second computer (e.g., by a computer 140, 160) as the additional processing operations 360-375, the received data includes the identified 315 locations and associated timestamp information.

In any case, the data continues to be received 360 until a check 365 shows a sequence is ready to be processed. In addition, as noted above, the operations can be performed in parallel or concurrently, e.g., using hardware and/or operating system based multitasking, and/or using pipelining techniques, e.g., during the constructing 375. Thus, the receiving 360 can continue while processing 370 of one or more sequences occurs in parallel or concurrently; each component can start processing frame n+1, if available, right after handing off frame n to the downstream component, without having to wait for downstream components to finish first, e.g., stereo triangulation can be performed for the next frame even if the 3D tracker hasn't finished processing the locations of interest.

The sequence(s) in the output data 350 are processed 370 by the one or more second computers (e.g., by a computer 140, 160) by interpolating between specified 2D positions in specific image frames for the sequence(s), using the timestamps of the specific image frames, to produce a virtual 2D position at a predetermined point in time. The record for each location of interest (e.g., each blob found in each frame) in the output data 350 includes both the timestamp of the frame and an indication of the previous one or more locations of interest connected to this location of interest by the 2D tracking component (e.g., each blob is described with pointers to the previous blob/blobs it belongs to). Thus, it is possible to determine from this data 350 the time, location and direction of travel and speed of each location of interest/blob.

The data 350 thus enables the use of interpolation to produce virtual "intermediary" locations/blobs at any given point in time on a path, as long as there exists at least one location of interest/blob in the tree with an earlier timestamp, and at least one location of interest/blob with a later timestamp. In addition, in some implementations, the predetermined point in time is one of multiple time points of a predefined constant frame rate of a 3D tracking server. For example, a 3D tracking server computer 140, 160 can run on a predefined constant frame rate and use interpolation to generate virtual snapshots of all the cameras' blobs at these points in time. Since the blob coordinates now all represent the same point in time, triangulation between the points is possible even though the original capture was not synchronous. Moreover, in some implementations, the predetermined point in time is a time specified by another sensor, such as another camera sensor or a radar sensor.

Figure 5:
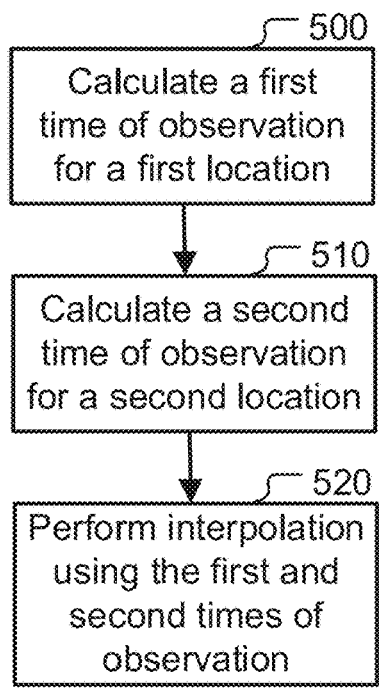
FIG. 5 shows an example of a process that interpolates between specified 2D positions in specific image frames obtained from a rolling shutter camera.

Furthermore, as noted above, the camera can be a rolling shutter camera, in which case, the output data 350 can include a time offset value for each location of interest included in each sequence. With this data in hand, the processing 370 also works for virtual time synchronization with a rolling shutter camera. FIG. 5 shows an example of a process that interpolates between specified 2D positions in specific image frames obtained from a rolling shutter camera.

A first time of observation for a first location having one of the specified 2D positions in the specific image frames is calculated 500 by adding a first time offset value for the first location to the timestamp of a first of the specific image frames. For example, the time offset (dt) of a first blob within a first frame (as detailed above in Tables 3 and 7) can be added to the timestamp (t_sync) of that first frame (as detailed above in Tables 2, 3, 6, and 7). A second time of observation for a second location having another one of the specified 2D positions in the specific image frames is calculated 510 by adding a second time offset value for the second location to the timestamp of a second of the specific image frames. For example, the time offset (dt) of a second blob within a second frame (as detailed above in Tables 3 and 7) can be added to the timestamp (t_sync) of that second frame (as detailed above in Tables 2, 3, 6, and 7). Then, the interpolating is performed 520 using the first time of observation and the second time of observation, calculated from the time offsets and the frame timestamps.

Returning to FIG. 3, with the virtual 2D position produced, a 3D track of the object (e.g., a ball) in motion in 3D space is constructed 375 (e.g., by a computer 140, 160) using the virtual 2D position that was produced, and position information obtained from at least one other sensor for the predetermined point in time. The constructing 375 can be for display (e.g., immediate display) of the 3D track of the object, or the constructing 375 can produce the 3D track for use as input to further processing before display. For example, the 3D track can be further processed to be effectively displayed by overlaying a trace of a golf ball in a TV signal produced for live transmission, or for recording. As another example, the 3D track can be further processed to be effectively displayed by augmenting other data or media, such as by showing the path of a golf ball in a computer representation of a physical environment in which a golfer is located, or in a virtual environment that exists only in the computer but is displayed to a user of the system.

Other types of further processing before display are also possible. For example, the 3D track can be further processed to determine the final resting positing of the sporting ball, which can be useful for betting applications or general stats collection that feeds sport web sites. In addition to showing the trace, the 3D track can be further processed to measure the velocity, spin, carry and launch angle of the shot. The 3D track can be further processed to determine whether balls went over the netting at a site and into the neighboring premises. The 3D track can be further processed to tell the range owner which bays have ongoing activity and also to count the number of balls that were shot from each bay.

Figure 6B:
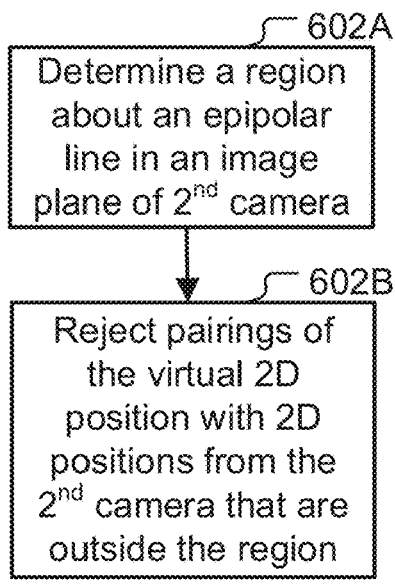
FIG. 6B shows an example of a process that excludes at least one 2D position obtained from a second camera.
Figure 6A:
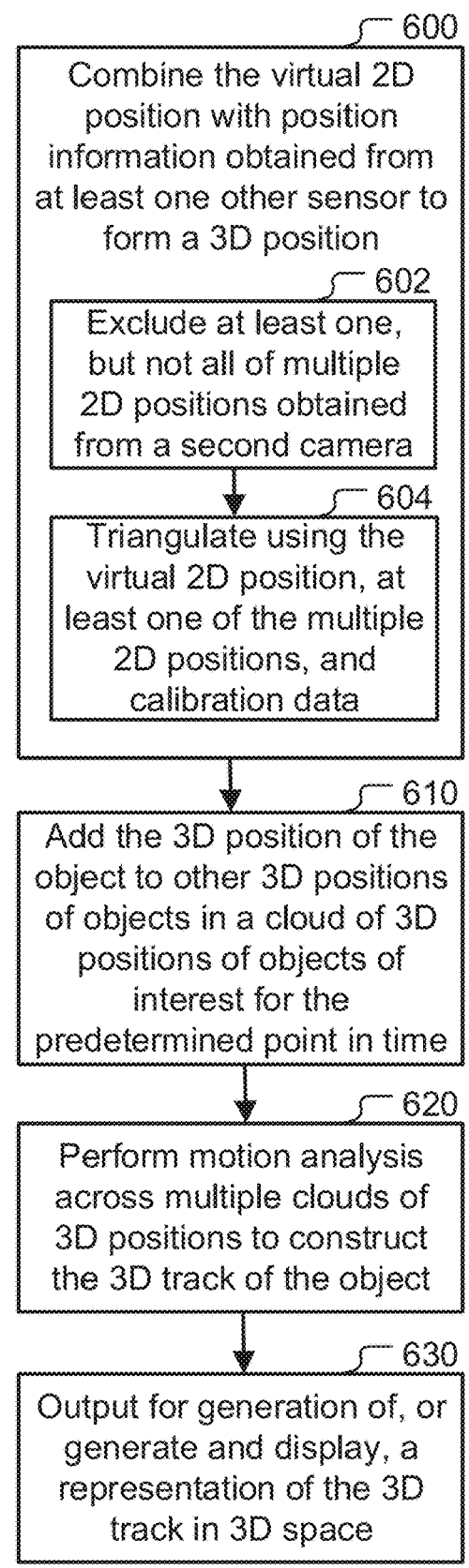
FIG. 6A shows an example of a process that constructs a 3D track of an object (e.g., a ball) in motion.

FIG. 6A shows an example of a process that constructs a 3D track of an object (e.g., a ball) in motion. The 3D track construction includes combining 600 (e.g., by a computer 140, 160) the virtual 2D position with the position information obtained from the at least one other sensor to form a 3D position of an object of interest. In general, this involves triangulation of the observations from the different sensors, using the object observation data produced using those different sensors, and using calibration data for those different sensors. Note that the produced observation data is usable in the triangulation because of the virtual time synchronization achieved by producing the virtual 2D position.

For example, the other sensor can be a second camera, which is to be used as a stereo pair with the first camera for which the virtual 2D position was produced. The object detection, 2D tracking and virtual time synchronization techniques described above can also be used with the second camera. In light of this, the output data for the second camera can produce multiple detected objects (with multiple corresponding virtual 2D positions) at the same, shared point in time for which the virtual 2D position was produced for the first camera. Thus, the position information for the second camera can be two or more 2D positions obtained from the second camera, and the combining 600 can include determining which of the two or more 2D positions from the second camera should be matched up with the virtual 2D position produced for the data from the first camera.

Further, the combining 600 can involve excluding 602 at least one, but not all of the two or more 2D positions obtained from the second camera as not able to form a 3D point with the virtual 2D position obtained from the first camera. FIG. 6B shows an example of a process that excludes at least one 2D position obtained from a second camera to effect epipolar line filtering before triangulation 604. A region about at least a portion of an epipolar line in an image plane of the second camera is determined 602A using the virtual 2D position produced for the first camera, an optical center of the first camera, an optical center of the second camera, a baseline between the first and second cameras, and extrinsic calibration data for the first and second cameras. In some implementations, the region is determined 602A based on a margin of error for the data being used.

In some implementations, the baseline between the first and second cameras 120, 130 of a stereo camera pair is thirty meters or less, which provides a reasonable stereo precision in combination with the ability to detect the shot early enough to be able to extrapolate the trajectory back to the location it was hit from. Using a lens with a wider field-of-view allows the shot to be observed earlier, but at the expense of less precision when the ball is far away. Higher resolution cameras can mitigate this to some extent. A shorter baseline provides less depth precision but allows the shots to be observed earlier. Note that using the virtual time synchronization described in this disclosure, the data from different pairs of cameras 120, 130 can be combined as needed, e.g., dynamically in real time. Thus, different pairs of cameras 120, 130 in the system can form a stereo pair, and the different stereo camera pairs can thus have different baselines and different depth precision.

Further, in some implementations, the determined 602A region is reduced (or further reduced) 602A based on portions of the epipolar line that cannot be used due to known limits on the distance to the object, e.g., the known distance between the camera and the tee area 112 and/or target 114. Moreover, other criteria can be used when matching up observations of ball candidates from different cameras used as one or more stereo pairs. For example, an additional criterion can be that the blob contrast for the respective blobs observed by two cameras (used as a stereo pair) are similar.

Then, pairings of the virtual 2D position obtained from the first camera with respective ones of the two or more 2D positions obtained from the second camera are rejected 602B in response the respective ones of the two or more 2D positions being outside the region about the at least a portion of the epipolar line in the image plane of the second camera. In essence, the line in 3D space that is seen by the first camera as a single point in the 2D plane of the first camera (because this line is directly in line with the first camera's optical center) is seen by the second camera as a line in the image plane of the second camera, which is known as the epipolar line. Given a known 2D position of an object observed by the first camera, only objects observed by the second camera that fall along this epipolar line (within some tolerance value) can be the same object observed by both cameras. Moreover, if the system is designed and setup with known limits on what distances to objects should be considered (e.g., distances based on the distance to the tee area 112, the distance to the target 114, such as distance to a green when tracking balls coming onto the green, and/or distance(s) to objects that are currently being tracked) the system can place hard stops (boundaries) on the epipolar line for use in the rejecting 602B. Thus, objects that are clearly out of bounds (e.g., airplanes, birds, lights from distant traffic, etc.) can be readily ignored by the system.

Other approaches to excluding 2D positions obtained from the second camera are also possible. For example, as noted above, the output data can include, for each location after an initial location in each sequence, an indication of a previous location in the sequence. Because this data is included (e.g., because the sending 330 transmits not only the position of each blob but also the position of earlier observed blobs that have been connected by the 2D tracking in a path sequence) the possible 2D motion direction and velocity of each object of interest (blob) can be estimated, and this estimation can be used to do motion filtering before triangulation 604, e.g., the stereo triangulation algorithm can use this information to reject blob pairings with incompatible parameters, such as by using the velocity vectors of the left and right stereo points to rule out false positives. For example, when the location of where the object will be in the next frame is predicted (based on the current velocity) in both cameras, the predicted locations (when triangulated) will also end up close to the next actual observation when the blobs are indeed observations of the same object from two different angles.

Thus, the excluding 602 can involve: estimating a 2D velocity for an object at the virtual 2D position based on the specified 2D positions in the specific image frames, where at least one of the specified 2D positions is identified in the output data using an indication of a previous location in the at least one of the sequences; estimating 2D velocities for objects at the two or more 2D positions obtained from the second camera; and rejecting pairings of the virtual 2D position obtained from the first camera with respective ones of the two or more 2D positions obtained from the second camera based on the 2D velocities estimated for the object at the virtual 2D position and for the objects at the two or more 2D positions, and the intrinsic calibration data and the extrinsic calibration.

Note that the coordinates of the location/blob need to be both undistorted using the intrinsic calibration data and also converted to compatible coordinate systems using the extrinsic calibration data, as will be appreciated by those skilled in the field. An intrinsic calibration can be performed that finds the optical distortion and true focal length of each camera. An extrinsic calibration can be performed that finds the direction of the cameras in relation to each other. Together, the intrinsic and extrinsic calibrations are referred to as "the calibration", or "the calibration data", and can be used for triangulating the position of objects that are seen by both cameras.

In addition, the other sensor can include a radar device rather than a second camera. For example, one or more radar devices can be combined with a single camera, with a stereo camera pair, or with three or more cameras, to form one or more hybrid camera-radar sensors, in accordance with the systems and techniques described in U.S. Pat. No. 10,596,416, to provide at least a portion of the sensors of an object detection system that register objects of interest for 3D object tracking. Readings from the radar(s) that may be detections of a moving object (e.g. a golf ball) can be added to a 3D point cloud of three-dimensional positions of the objects of interest and thus add to the potential robustness and coverage area of the combined sensors.

The readings from the radar can be turned into 3D points using the following approach. A distance measurement from the radar can be combined with all ball candidates detected by one of the cameras at the same point in time. The angle to each ball candidate, as reported by the camera, and the distance reported by the radar will determine a 3D location in space. This can be done for each ball candidate seen by the camera, which will produce an array of 3D points to add to the point cloud. At most one of those points will be a correct association of radar data and a ball observation (meaning they both stem from the same object; a true positive). The rest of the 3D points will be false associations (false positives). However, again, the 3D point tracking algorithm is chosen to be robust against a majority of 3D points being false positives. Moreover, in some implementations, one or more radar sensors that are capable of determining both range and angle to each observed object can be used in the system.

But regardless of whether or how position data from a second sensor is obtained and/or excluded, in some implementations, a 3D position of the object of interest can be triangulated 604 using the virtual 2D position obtained from the first camera, at least one of the two or more 2D positions obtained from the second camera, intrinsic calibration data for the first camera and the second camera (the determined optical distortion and true focal length of each camera), and extrinsic calibration data for the first and second cameras (the determined direction of the cameras in relation to each other). Note that since the coordinates of the locations/blobs all represent the same point in time, triangulation 604 between the points is possible even though the original capture was not synchronous.

Then, the 3D position of the object of interest can be added 610 to other 3D positions of objects of interest in a cloud of 3D positions of objects of interest for the predetermined point in time. Note that various types of data structures can be used. In some implementations, the clouds of 3D positions are stored as octrees, and this type of data structure allows any point in 3D space to be represented (to the precision limit of the computer representation of scalar numbers). Motion analysis across multiple clouds of 3D positions is performed 620 to construct the 3D track of the ball in motion in 3D space, where each of the multiple clouds is for a single point in time. Note that various types of motion analysis can be used. Nonetheless, it should be appreciated that, even though the number of false positives included in the data 350 may be larger than that of a traditional object tracking technique, these false positives tend to be spread out in the 3D space, which is large in comparison to the 2D image plane of the camera from which the false positives originate. Because of this, once the 3D tracking system identifies an object in 3D motion, it is straight forward for the 3D tracking system to readily discard any false positives in the 3D space that do not match up with the ongoing 3D track being constructed.

In addition, the process can include outputting 630 the 3D track for generation of a representation of the 3D track, or generating and displaying 630 the representation of the 3D track in 3D space. As noted above, this can involve further processing of the 3D track to effectively display it by overlaying a trace of a golf ball in a TV signal produced for live transmission, or for recording, or this can involve further processing of the 3D track to effectively display it by augmenting other data or media, such as by showing the path of a golf ball in a computer representation of a physical environment in which a golfer is located, or in a virtual environment that exists only in the computer but is displayed to a user of the system, e.g., a virtual environment that is shared between participants in a multi-player game (either locally on the same range or scattered across the globe).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The non-transitory computer-readable medium can be a manufactured product, such as hard drive in a computer system or an optical disc sold through retail channels, or an embedded system. The non-transitory computer-readable medium can be acquired separately and later encoded with the one or more modules of computer program instructions, such as by delivery of the one or more modules of computer program instructions over a wired or wireless network. The non-transitory computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and one or more processors of any suitable kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; CD-ROM and DVD-ROM disks; network attached storage; and various forms of cloud storage. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be sensory feedback, e.g., visual feedback, auditory feedback, or tactile feedback; and input from the user can be received in various forms, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any suitable combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Thus, unless explicitly stated otherwise, or unless the knowledge of one of ordinary skill in the art clearly indicates otherwise, any of the features of the embodiment described above can be combined with any of the other features of the embodiment described above.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the description above focuses on tracking the motion of a golf ball, but the systems and techniques described are also applicable to other types of object motion tracking, such as for baseball or skeet shooting, as well as non-sports applications. Further, tracking an object "in motion" can include tracking the object when it bounces off and/or rolls along the ground, in some implementations.

What is claimed is:

1. A method comprising:
   performing object detection in uncompressed, two-dimensional image data from a camera to produce two-dimensional location data for objects of interest;
   processing the two-dimensional location data for the objects of interest using a motion criterion to generate possible paths data for the objects of interest; and
   constructing a flight track of an object in three-dimensional space, from the possible paths data and position information obtained from a sensor, by filtering out false positives in the possible paths data.

2. The method of claim 1, wherein performing the object detection and processing the two-dimensional location data effectively compresses ball location data, to reduce bandwidth requirements for sending the possible paths data, in a manner that enables virtual time synchronization of measured object positions.

3. The method of claim 1, wherein performing the object detection comprises storing in a list both a location and a size for each set of one or more pixels in the uncompressed, two-dimensional image data from the camera that satisfy an object detection criteria.

4. The method of claim 3, wherein performing the object detection comprises adaptively adjusting noise thresholds, and processing the two-dimensional location data comprises initiating a possible new path only when a detected object satisfies a predefined size criterion.

5. The method of claim 1, wherein performing the object detection comprises using a low threshold to favor zero false negatives, while allowing plenty of false positives in the object detection.

6. The method of claim 5, wherein processing the two-dimensional location data comprises finding sequences of detected objects over three or more image frames that indicate object movement consistent with that of an object in Newtonian motion.

7. The method of claim 6, wherein the motion criterion is defined to include displacement, velocity, acceleration, or a combination thereof, in each of x and y image dimensions, being inside a predefined range of values.

8. The method of claim 5, wherein processing the two-dimensional location data comprises loose filtering that allows objects other than objects in motion to be included in the possible paths data, thereby increasing false positives and minimizing false negatives in the possible paths data.

9. The method of claim 1, wherein processing the two-dimensional location data comprises predicting a next location to add to a possible path for the objects of interest.

10. The method of claim 1, comprising only sending a possible path for flight track construction when the possible path includes a sequence of locations that exceeds a specified minimum number of locations.

11. The method of claim 10, comprising actively determining the specified minimum number of locations based on one or more factors comprising a total number of possible paths currently being generated.

12. The method of claim 10, comprising delaying output of possible paths data for a given image frame until no further detected objects in the given image frame can be included in a sequence of locations that exceeds the specified minimum number of locations.

13. A system comprising:
a camera;
a sensor; and
two or more computers communicatively coupled with the camera and the sensor;
wherein the two or more computers are configured to
perform object detection in uncompressed, two-dimensional image data from the camera to produce two-dimensional location data for objects of interest,
process the two-dimensional location data for the objects of interest using a motion criterion to generate possible paths data for the objects of interest, and
construct a flight track of an object in three-dimensional space, from the possible paths data and position information obtained from the sensor, by filtering out false positives in the possible paths data.

14. The system of claim 13, wherein the camera, the sensor, and at least one of the two or more computers is located in a sports stadium, and the two-dimensional location data for the objects of interest, the possible paths data for the objects of interest, or both, are sent from a first of the two or more computers to a second of the two or more computers using one or more lower bandwidth, longer distance data communication technologies.

15. The system of claim 14, wherein the one or more lower bandwidth, longer distance data communication technologies comprise wireless data connections.

16. The system of claim 13, wherein the camera, the sensor, and at least one of the two or more computers is located on a golf course, and the two-dimensional location data for the objects of interest, the possible paths data for the objects of interest, or both, are sent from a first of the two or more computers to a second of the two or more computers using one or more lower bandwidth, longer distance data communication technologies.

17. The system of claim 16, wherein the camera is located behind a green on the golf course for a golf competition, the second of the two or more computers is positioned at a television broadcast facility that is a mile or more from the green on the golf course, and the television broadcast facility is configured to overlay a trace of the flight track of the object onto video data obtained by a television camera.

18. The system of claim 13, wherein the camera and the sensor are included in a set of three or more sensors located at a golf range, a grass field, or another open area into which golf balls can be launched.

19. The system of claim 13, wherein the sensor comprises a radar device.

20. The system of claim 13, wherein the sensor comprises another camera.

21. The system of claim 20, wherein at least one of the two or more computers is configured to filter out the false positives in the possible paths data at least in part by being configured to perform epipolar line filtering before triangulation.

22. The system of claim 13, wherein a first computer of the two or more computers comprises embedded firmware configured to process the two-dimensional location data, and a second computer of the two or more computers comprises one or more data processing apparatus encoding software configured to construct the flight track of the object in three-dimensional space.

23. The system of claim 13, wherein a first computer of the two or more computers is configured to perform the object detection, a second computer of the two or more computers is configured to process the two-dimensional location data, and a third computer of the two or more computers is configured to construct the flight track of the object in three-dimensional space.

24. The system of claim 23, wherein the first computer is configured to perform pre-tracking in two dimensions using loose constraints.

25. The system of claim 13, wherein the camera is a rolling shutter camera, and the two or more computers are configured to take into account particular time offsets of detected object locations within a frame of the rolling shutter camera.

* * * * *